US 9,260,056 B2

(12) United States Patent
Strout et al.

(10) Patent No.: US 9,260,056 B2
(45) Date of Patent: Feb. 16, 2016

(54) DISPLAY DEVICE MOUNTABLE ON AN AUTOMOTIVE VEHICLE AND METHOD

(71) Applicants: Arthur Strout, Itasca, IL (US); Maurice Haff, Edmond, OK (US)

(72) Inventors: Arthur Strout, Itasca, IL (US); Maurice Haff, Edmond, OK (US)

(*) Notice: Subject to any disclaimer, the term of this patent is extended or adjusted under 35 U.S.C. 154(b) by 0 days.

(21) Appl. No.: 14/143,132

(22) Filed: Dec. 30, 2013

(65) Prior Publication Data

US 2014/0111323 A1 Apr. 24, 2014

Related U.S. Application Data

(63) Continuation-in-part of application No. 14/029,479, filed on Sep. 17, 2013, now abandoned, which is a continuation of application No. 13/966,992, filed on Aug. 14, 2013, now Pat. No. 8,760,880, which is a continuation of application No. 13/594,959, filed on Aug. 27, 2012, now Pat. No. 8,537,561.

(60) Provisional application No. 61/610,836, filed on Mar. 14, 2012, provisional application No. 61/528,365, filed on Aug. 29, 2011.

(51) Int. Cl.
*G06Q 30/00* (2012.01)
*B60Q 1/26* (2006.01)
*B60S 1/04* (2006.01)

(52) U.S. Cl.
CPC .............. *B60Q 1/268* (2013.01); *B60S 1/0491* (2013.01)

(58) Field of Classification Search
USPC ................................................... 40/591, 592
See application file for complete search history.

(56) References Cited

U.S. PATENT DOCUMENTS

| | | | |
|---|---|---|---|
| 1,506,797 A | 9/1924 | Wessig | |
| 2,591,337 A | 4/1952 | Cohen et al. | |
| 3,161,973 A | 12/1964 | Hastings et al. | |
| 4,574,269 A * | 3/1986 | Miller | 362/503 |
| 5,255,464 A | 10/1993 | Marecek | |
| 5,456,753 A | 10/1995 | Kuribayashi et al. | |
| 5,715,620 A | 2/1998 | Walker | |
| 5,878,516 A | 3/1999 | Amirian | |
| 5,933,991 A | 8/1999 | Gaul | |
| 6,918,200 B2 | 7/2005 | Penna | |
| 6,922,929 B1 | 8/2005 | Schramek | |
| 7,154,383 B2 | 12/2006 | Berquist | |
| 7,882,653 B2 | 2/2011 | Barlow | |
| 7,936,564 B1 | 5/2011 | Brown et al. | |
| 2002/0064902 A1* | 5/2002 | Sayyah | 438/107 |
| 2002/0084891 A1* | 7/2002 | Mankins et al. | 340/425.5 |
| 2002/0139394 A1 | 10/2002 | Bronson | |
| 2008/0195489 A1* | 8/2008 | Gold et al. | 705/14 |
| 2008/0300988 A1* | 12/2008 | Hoang et al. | 705/14 |
| 2010/0170123 A1* | 7/2010 | DoVale, Jr. | B60B 7/20 40/587 |
| 2012/0116861 A1* | 5/2012 | Dobyns | 705/14.34 |

(Continued)

FOREIGN PATENT DOCUMENTS

EP 2547180 1/2013

*Primary Examiner* — Michael Bekerman
*Assistant Examiner* — Michael W Schmucker
(74) *Attorney, Agent, or Firm* — Berenato & White, LLC

(57) ABSTRACT

An electronic display system mountable in a window cavity of an automotive vehicle comprising: a conformal digital display installable in a window cavity of an automotive vehicle; a communication device for wireless receiving of digital images and control instructions; a storage device for at least temporarily retaining digital image files and control instructions; a locator device for determining the location of the electronic display system, and a vehicle interface for interconnection with the automotive vehicle.

14 Claims, 23 Drawing Sheets

(56) References Cited

U.S. PATENT DOCUMENTS

| | | |
|---|---|---|
| 2012/0159817 A1 | 6/2012 | Nakamichi |
| 2012/0233897 A1 | 9/2012 | Gold et al. |
| 2012/0290412 A1* | 11/2012 | Marovets .................. 705/14.73 |
| 2013/0204678 A1* | 8/2013 | Liu et al. ..................... 705/14.4 |

* cited by examiner

FIG. 1    Direction of wiper arm rotation

DISPLAY DEVICE MOUNTABLE ON AN AUTOMOTIVE VEHICLE AND METHOD

CROSS REFERENCES TO RELATED APPLICATIONS

This application is a continuation-in-part of U.S. patent application Ser. No. 14/029,479 filed Sep. 17, 2013 by Strout et al., which is a continuation of Ser. No. 13/966,992 filed Aug. 14, 2013 by Strout et al., which is a continuation of U.S. patent application Ser. No. 13/594,959 Filed: Aug. 27, 2012 entitled "A display device mountable on an automotive vehicle and method" now U.S. Pat. No. 8,537,561 the entire disclosures of which are incorporated herein by reference each in its entirety for all purposes. This application is also based on and claims the benefit of U.S. Provisional Patent Application No. 61/528,365 filed on Aug. 29, 2011 and U.S. Provisional Patent Application No. 61/610,836 filed on Mar. 14, 2012 in the name of Arthur Strout, et al., which are expressly incorporated herein by reference each in its entirety.

BACKGROUND OF THE INVENTION

1. Field of the Invention

The present invention is related to display devices mountable on an automotive vehicle, and used to present text and graphics. More particularly, the present invention is directed to an apparatus mountable internally or externally on a rear or side portion of an automotive vehicle and associated method(s) for displaying text and graphics in physical form media such as that used to display personal messages and advertising.

2. Background of the Invention and Related Art

The purpose of displaying physical form media on automotive vehicles varies widely, and may be for typical intentions such as delivering a commercial message or impression, asserting a personal belief or perspective, supporting and promoting an organization or school, or simply for personal pleasure. In general, the intent of placing physical form media on an automotive vehicle is to capture the attention of observers so that the text or graphic displayed delivers the intended message. This is typical of signage placed on taxis and other commercial vehicles.

Positioning of the physical form media on an automotive vehicle may depend on the intended audience, such as pedestrians or other motorists. The desired period of observation may also be a factor in selecting the placement and type of physical form media, with three dimensional media placed on the top of a vehicle and two dimensional media placed on the rear of a vehicle providing relatively greater opportunity for observation during vehicle motion away from an observing pedestrian or by a following motorist.

Effectiveness of physical form media in commanding attention of observers and delivering the intended message often varies with the type of physical form media employed and its placement on the vehicle, as well as message content and format. Digital displays are increasingly being installed on taxi tops to provide dynamic display of images and text. Digital displays are also being installed on the sides of panel trucks and on trailers. These displays are primarily visible from a side view of a vehicle on which they are mounted.

Magnetic signs, vehicle graphics, and decals do not provide the means for dynamic image displays on automotive vehicles. Temporary displays typically used on top of privately owned vehicles employed for pizza delivery are not dynamic. Mounting a digital display on top of a vehicle is generally not at the eye level of an observer in a following vehicle and may require a physically larger device and message to assure capturing their attention and delivering the intended message. In addition, such a display on top of a vehicle is subject to high wind pressure during motion of the vehicle, requiring stronger attachment points than if less wind pressure were present, which can increase cost. Thus, an electronic display device mountable internally or externally on the rear of an automotive vehicle, exposing the device to relatively less wind pressure, and located substantially at eye level of an observer in a following vehicle is needed to provide lower cost and effective physical media for dynamically presenting text and graphic messages in personal and commercial applications.

SUMMARY OF THE INVENTION

According to a broad aspect, the present invention provides a display device mountable on an automotive wiper arm, comprising a display panel having a front side for presentation of text or graphics and a back side for positioning one of a rotable connector or fixed connector, wherein said one of a rotable or fixed connector is configured to be attachable to said automotive wiper arm.

According to another broad aspect, the present invention provides a display device mountable on an automotive vehicle, comprising a display panel having a front side for presentation of text or graphics and a back side for mounting a connector. An arm-connector may be used for affixing the display device to at least a wiper arm of the automotive vehicle, along with a shaft linking the arm-connector to the display panel. A shaft-connector provides for affixing the shaft to the display panel, the shaft-connector comprising part of the shaft. A display-connector affixes the shaft to the display panel, the display-connector comprising the connector positioned on the display panel backside. The shaft-connector and the display-connector are configured to lock together after one is connected to the other, preventing separation of the display panel from the shaft during motion of the automotive vehicle and rotational motion of the wiper arm. The arm-connector may be configured to affix to the automotive wiper arm or other connection point and maintain sufficient pressure to avoid rotation of the shaft around and generally perpendicular to the automotive wiper arm or other connection point as a result of airflow pressure on the display panel during vehicular motion.

In other aspects of the present invention, the display-connector may be positioned asymmetrically on the backside of the display panel. In addition, the shaft-connector and the display-connector may be rotation-point connectors configured to allow the display panel to rotate on the shaft during movement of the automotive wiper arm. Asymmetric positioning of the display-connector and use of rotation point connectors serves to maintain orientation of the text or graphics present on the display panel relatively level with respect to the ground during rotational movement of the automotive wiper arm. Where a selected attachment point on a vehicle remains substantially stationary with respect to the vehicle, a rotation-point connector may be mechanically altered to maintain the display panel in a relatively fixed position.

According to a another broad aspect, the present invention provides a display device mountable at least on an automotive wiper arm, comprising a display panel having a front side for presentation of text or graphics and a back side for positioning a connector. An arm-connector affixes the display device to the automotive wiper arm or other connection point and a shaft links the arm-connector to the display panel. A first rotation-point connector affixes the shaft to the display panel, the rotation-point connector comprising part of the shaft. A second rotation-point connector affixes the shaft to the display panel, the second rotation-point connector comprising the connector positioned on the display panel backside. The first rotation-point connector is configured to insert into the second rotation-point connector and lock into the second rotation-point connector substantially preventing separation after connecting the first rotation-point connector to the second rotation-point connector. The first and second rotation-point connectors are configured to allow the display panel to rotate on the shaft during rotational movement of the automotive wiper arm.

In another aspect of the present invention, the second rotation-point connector may be positioned asymmetrically on the backside of the display panel, wherein orientation of the text or the graphics present on the display panel may be maintained relatively level with respect to the ground during movement of the automotive wiper arm.

In another aspect of the present invention, the display panel may be comprised of semi-flexible plastic material and may have a thickness in the range of 0.25 inches to 1.5 inches, the thickness being needed to maintain shape of the display panel depending on the stiffness characteristics of the semi-flexible plastic and the shape of the display panel.

In another aspect of the present invention, the display panel may be comprised of relatively rigid plastic material having a thickness in the range of 0.2 inches to 0.6 inches, the thickness being needed to maintain shape of the display panel depending on the stiffness characteristics of the rigid plastic and the shape of the display panel.

In another aspect of the present invention, the display panel is comprised of a plastic material configured with raised ridges on the backside to stiffen the display panel, the raised ridges radiating out from the second rotation-point connector.

In another aspect of the present invention, the display panel may be shaped in three dimensions to substantially conform to the shape of text and/or graphics presented on the display panel.

In another aspect of the present invention, the display panel may further comprise an electronic display enabling dynamic presentation or reconfiguration of text and/or graphics on the display panel, and which electronic display may be powered by an internal battery, the vehicle electrical system, solar cells, or a combination of these power sources.

In another aspect of the present invention, the first rotation-point connector may be conical in shape having an apex at a forward end away from the shaft and a base diameter greater than a shaft diameter at the point where the first rotation-point connector and the shaft are fastened together. In addition, the second rotation-point connector may comprise a conical shaped receptor configured to receive the first rotation-point connector, the second rotation-point connector further comprising an integrated base ring situated at the base dimension of the conical shaped receptor, the base ring having an inner circular opening with a diameter less than the base diameter. The base ring may be configured with slots that allow expansion of the conical shaped receptor during insertion of the first rotation-point connector.

In yet another aspect of the present invention, the first rotation-point connector may comprise a conical shaped tip having an apex at a forward end situated away from the shaft and a plurality of flexible tip extenders divided from each other and extending angularly back toward the shaft and away from the conical shaped tip, the plurality of flexible tip extenders configured in a conical shape having an apex comprised of the conical shaped tip and a base diameter at outer ends of the flexible tip extenders greater than a shaft diameter at the point where the first rotation-point connector and the shaft are fastened together. In addition, the second rotation-point connector may comprise a conical shaped receptor configured to receive the first rotation-point connector, the second rotation-point connector further comprising an integrated base ring situated at the base dimension of the conical shaped receptor, the base ring having an inner circular opening with a diameter less than the base diameter comprised of the outer ends of the flexible tip extenders.

In another aspect of the present invention, the display device is mounted on an automotive wiper arm that is a component of an automotive windshield wiper system situated on the rear of an automotive vehicle, the automotive vehicle typically being one within a class of vehicles comprising one of sport utility vehicles, cross-over vehicles, trucks, vans, and recreational vehicles. In addition, the display panel of the display device may be weighted to provide a righting moment and promote a pendulum effect substantially positioning the second rotation-point connector above a lower portion of the display panel throughout the range of motion of the automotive wiper arm during operation of the automotive windshield wiper system.

According to a another broad aspect, the present invention provides a display device mountable on an automotive wiper arm, comprising a display panel having a front side for presentation of text or graphics and a back side for positioning a connector, an arm-connector for affixing the display device to the automotive wiper arm, a shaft for linking the arm-connector to the display panel, a shaft-connector for affixing the shaft to the display panel, the shaft-connector comprising part of the shaft, and a display-connector for affixing the shaft to the display panel, the display-connector comprising the connector positioned on the display panel backside. The arm-connector is configured to attach to the automotive wiper arm and maintain sufficient connective pressure to avoid rotation of the shaft around and perpendicular to the automotive wiper arm as a result of airflow pressure on the display panel during vehicular motion. The shaft-connector is a first rotation-point connector and the display-connector is a second rotation-point connector, and the second rotation-point connector is positioned asymmetrically on said backside of the display panel. The first rotation-point connector is configured to insert into the second rotation-point connector and lock into the second rotation-point connector substantially preventing separation after connecting the first rotation-point connector to the second rotation-point connector. The first and second rotation-point connectors are configured to allow the display panel to rotate on the shaft during rotational movement of the automotive wiper arm operated by the windshield wiper system.

In another aspect of the present invention, the first rotation-point connector may be conical in shape having an apex at a forward end away from the shaft and a base diameter greater than a shaft diameter at the point where the first rotation-point connector and the shaft are fastened together. In addition, the second rotation-point connector may comprise a conical shaped receptor configured to receive the first rotation-point connector, the second rotation-point connector further comprising an integrated base ring situated at the base dimension of the conical shaped receptor, the base ring having an inner circular opening with a diameter less than the base diameter. The base ring may be configured with slots that allow expansion of the conical shaped receptor during insertion of the first rotation-point connector.

In another aspect of the present invention, the first rotation-point connector may comprise a conical shaped tip having an apex at a forward end situated away from the shaft and a plurality of flexible tip extenders divided from each other and extending angularly back toward the shaft and away from the conical shaped tip, the plurality of flexible tip extenders configured in a conical shape having an apex comprised of the conical shaped tip and a base diameter at outer ends of the flexible tip extenders greater than a shaft diameter at the point where the first rotation-point connector and the shaft are fastened together. In addition, the second rotation-point connector may comprise a conical shaped receptor configured to receive the first rotation-point connector, the second rotation-point connector further comprising an integrated base ring situated at the base dimension of the conical shaped receptor, the base ring having an inner circular opening with a diameter less than the base diameter comprised of the outer ends of the point extenders.

In another aspect of the present invention, the display panel may be weighted to provide a righting moment and promote a pendulum effect substantially positioning the second rotation-point connector above a lower portion of the display throughout the range of motion of the automotive wiper arm during operation of the automotive windshield wiper system.

In another aspect of the present invention, the first rotation-point connector may comprise a conical shaped tip having an apex at a forward end situated away from the shaft and a plurality of flexible tip extenders divided from each other and extending angularly back toward the shaft and away from the conical shaped tip, the plurality of flexible tip extenders configured in a conical shape having an apex comprised of the conical shaped tip and a base diameter at outer ends of the flexible tip extenders greater than a shaft diameter at the point where the first rotation-point connector and the shaft are fastened together. In addition, the second rotation-point connector may comprise a cylindrical hole penetrating through and asymmetrically positioned on the display panel and configured to receive the first rotation-point connector, the second rotation-point connector having an inner circular opening with a diameter less than the base diameter comprised of the outer ends of the flexible tip extenders. In addition, the shaft may be configured with an enlargement of the shaft diameter positioned away from the apex tip and flexible tip extenders to provide a stop against which the back side of the display panel can rest.

In another aspect of the present invention, the first rotation-point connector may comprise a conical shaped tip having an apex at a forward end situated away from the shaft and a base diameter greater than a shaft diameter at the point where the first rotation-point connector and the shaft are fastened together. In addition, the second rotation-point connector may comprise a cylindrical hole penetrating through and asymmetrically positioned on the display panel and configured to receive the first rotation-point connector, the second rotation-point connector having an inner circular opening with a diameter less than the base diameter of the first rotation-point connector. In addition, the shaft may be configured with an enlargement of the shaft diameter positioned away from the apex tip to provide a stop against which the back side of the display panel can rest.

According to a another broad aspect, the present invention provides an electronic display apparatus comprising a display panel and a control device, the display panel providing digital display of text, graphics, and video, the control device providing wireless receiving of control instructions and streaming video, or image files, the control device being connectable to the display panel and the display panel positionable in a window cavity of an automotive vehicle, where the physical dimensions of the display panel may generally conform to the shape of the window cavity and the glass mounted therein.

In another aspect, the display panel comprises a viewable image area substantially filling the interior dimension of the window cavity of the automotive vehicle.

In another aspect, the display panel comprises at least one of a flexible or semi-flexible material.

In another aspect, the display panel is conformable to adapt to curvature of window glass positioned in the window cavity.

In another aspect, the display panel is mountable in the window cavity using at least one of adhesive, double-sided adhesive strips, hook and loop fasteners, clips, suction cups, an adjustable locking frame, or a rotating mount for repositioning the display into and out of the window cavity.

In another aspect, the display panel may be laminated to a surface or between layers of the window glass of the automotive vehicle.

In another aspect the display panel may be sized and shaped to conform to at least one of a rear window or a side window of the automotive vehicle.

In another aspect, the display panel is conformable around obstructions present in the window cavity and window glass.

In another aspect, the display panel may be mounted on the outside surface of the window glass of the automotive vehicle, where the display panel is weather resistant.

According to another broad aspect, the electronic display apparatus of the present invention is configurable to display digital images received wirelessly from at least one remote device and retain the digital images in a storage device connectable to a display panel or the control device, the display panel configured for relatively high resolution of the digital images displayed, and the viewable surface of the display panel substantially conformable to curvature of window glass occupying the window cavity of the automotive vehicle.

In another aspect, the display panel is conformable to adapt to substantial window curvature and the digital images may be displayed so that they appear to a viewer to have a three dimensional characteristic.

In another aspect, the display panel is transparent to allow an occupant of the automotive vehicle outward visibility, while digital images or videos are displayed and when the display panel is quiescent.

In another aspect, the display panel may be laminated to a surface or between layers of the window glass of the automotive vehicle.

In another aspect, aural content may be wirelessly received and audibly reproduced through electronic speakers extant in or added to the automotive vehicle.

In another aspect, the digital images include at least one of text, graphics, and video received from at least one remote device, where the at least one remote device is positioned in a specific geospatial location.

In another aspect, the electronic display apparatus is connectable to the electrical system of the automotive vehicle, where connection is made using one of a removable connector incorporated into a wiring harness or an extant electrical connector or port present in the automotive vehicle.

According to another broad aspect, the present invention provides an electronic display system mountable in an automotive vehicle comprising a conformal digital display installable on a surface structure of an automotive window glass, a control device for wireless receiving of textual content, digital images, video, and control instructions, a storage device for at least temporarily retaining textual content, digital image files, video, and control instructions, a locator device for determining the location of the electronic display system, and a vehicle interface for interconnection with the automotive vehicle.

In another aspect, the control device further comprises a transmitter for sending at least location information to a remote device.

In another aspect, textual content, digital image files and control instructions may be input to the storage device from a remote device integrated into the automotive vehicle or remotely positioned from the automotive vehicle.

In another aspect, an electronic security code embedded into the display panel uniquely identifies the display panel, and the security code is transmittable by the communication device.

In another aspect, the location information and the security code identifier are transmittable to a remote device, and where the remote device may respond with at least one of control instructions and streaming video.

In another aspect, the electronic display system further comprises localized communication devices configurable to send locally relevant digital images and text for display on the display panel.

In another aspect, locally relevant digital images may comprise text, graphics and video related to a specific location.

In another aspect, a control device of the present invention may include command sequencing as the determinant of presentation and display timing of text, video, audio, and graphic images (e.g., advertising content), including streaming video.

In another aspect, command sequence events may be embedded in application code operable on the control device, where command sequencing may further govern receipt of text, video, audio, and graphic images from remote devices.

In another aspect, command sequence events may govern receiving location triggers from local remote devices.

In another aspect, command sequence events may govern display of text, video, audio, and graphic images.

In another aspect, command sequence events may govern sending location coordinates to remote devices positioned remotely from the automotive vehicle.

In another aspect, command sequence events may govern communication and interaction with a remote device installed and operable on an automotive vehicle, such as a GPS receiver.

In another aspect, text, graphics, and video, including streaming video, may be simultaneously presented where the display panel is configured in divided screen segments by a command sequence event.

In another aspect, aural content related to text, graphics, and video, including streaming video, may be wirelessly received and audibly reproduced through electronic speakers extant in or added to the automotive vehicle.

In another aspect, aural content may be wirelessly received and converted to text and subsequently converted to graphics and video displayable on to the automotive vehicle.

In another aspect, textual content may be wirelessly received and converted to graphics and video displayable on to the automotive vehicle.

In another aspect, a plurality of content types may be received from at least one remote device in response to a user initiated purchase of said content from the at least one remote device using an electronic ordering and payment interface affiliated with said remote device.

According to another broad aspect, the present invention provides an electronic display system comprising a conformal digital display panel installable on a flat or curved structure of a frame mountable on the rear portion of an automotive vehicle, a control device for wireless receiving of textual content, digital images, video, and control instructions, a storage device for at least temporarily retaining textual content, digital image files, video, and control instructions, a locator device for determining the location of the electronic display system, and a vehicle interface for interconnection with the automotive vehicle.

In another aspect, the frame may be mountable by attaching an upper portion of the frame to at least a rear windshield wiper assembly using a rotational connector encompassing the wiper assembly motor shaft, where the windshield wiper assembly comprises at least a motor, a motor shaft, and a wiper arm attached to the motor shaft.

In another aspect, the frame may be mountable by attaching a lower frame portion to connecting positions in a license plate cavity on the rear portion of the automotive vehicle.

In another aspect, the upper and lower frame mounting methods may be used together.

In another aspect, stabilizing connectors may be added at the side portions of the frame attachable to side portions of a rear door hatch as commonly found on a sport utility vehicle (SUV).

In another aspect, the electronic display system is connectable to the automotive vehicle electrical system using a power connector installable in the electrical port commonly used for a lamp intended for illumination of a license plate, and said power connector may include a provision for an illuminator.

DETAILED DESCRIPTION OF PREFERRED EMBODIMENTS OF THE INVENTION

Figure 1:
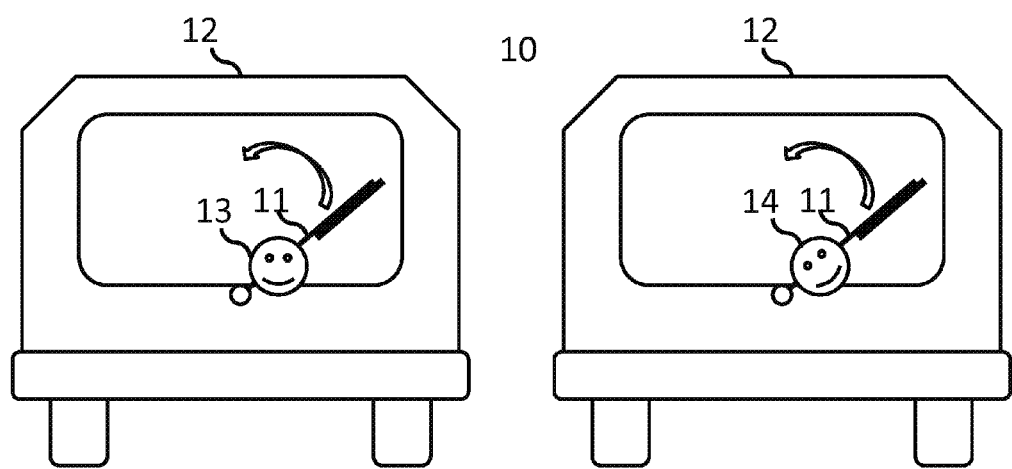
FIG. 1 is a non-limiting diagram showing the apparatus of the present invention as it may typically be positioned on a wiper arm of a windshield wiper system located on the rear of a sport utility vehicle, and how the text and graphics presented on the display panel may remain relatively level during rotational motion of the wiper arm, provided the display-connector is position asymmetrically and/or the lower portion of the display panel is weighted.

In brief: FIG. 1 is a non-limiting drawing showing the apparatus of the present invention as it may typically be positioned on a wiper arm of a windshield wiper system located on the rear of a sport utility vehicle, and how the text and graphics presented on the display panel may remain relatively level during rotational motion of the wiper arm, provided the display-connector is connected as a rotation-point connector positioned asymmetrically and/or the lower portion of the display panel is weighted. If the display-connector is substantially centered on the back side of the display panel, and the display panel is not asymmetrically weighted, the orientation of the display panel will remain substantially unchanged with respect to the wiper arm as the wiper arm moves rotationally during operation of the windshield wiper system.

Figure 2:
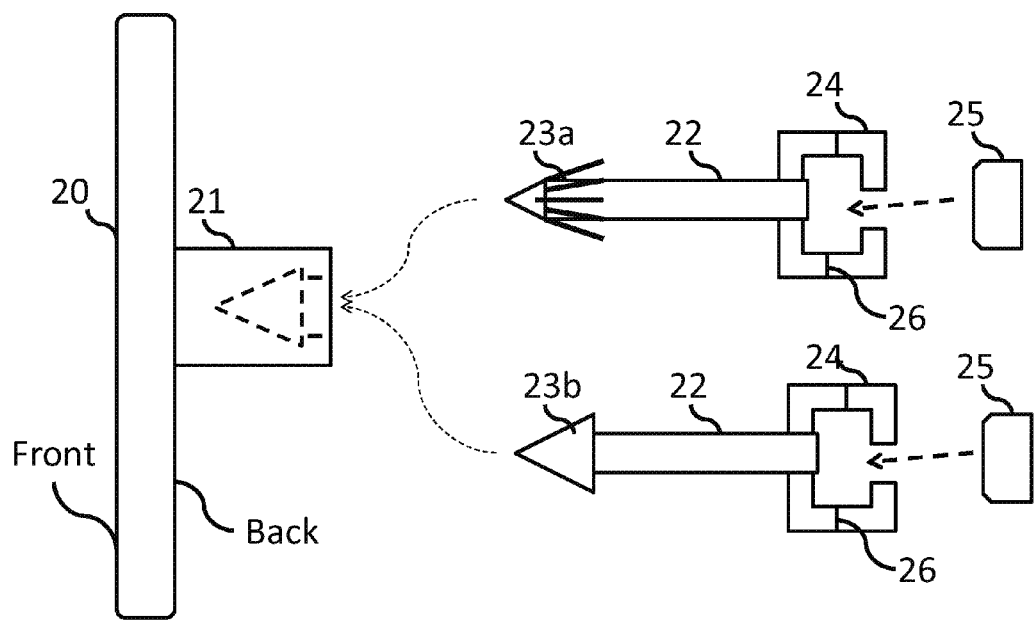
FIG. 2 is a non-limiting diagram showing the display panel with a display-connector positioned substantially centered on the back side and two configurations of the shaft with shaft-connector and arm-connector.

FIG. 2 is a non-limiting diagram showing the display panel with a display-connector positioned substantially centered on the back side and two configurations of the shaft with shaft-connector and arm-connector. The display-connector affixes the shaft to the display panel, the display-connector comprising the connector positioned on the display panel backside. The shaft-connector and the display-connector are configured to lock together after one is connected to the other, preventing separation of the display panel from the shaft during motion of the automotive wiper arm. The arm-connector is configured to clasp the automotive wiper arm and maintain sufficient pressure to avoid rotation of the shaft around and generally perpendicular to the automotive wiper arm.

Figure 3:
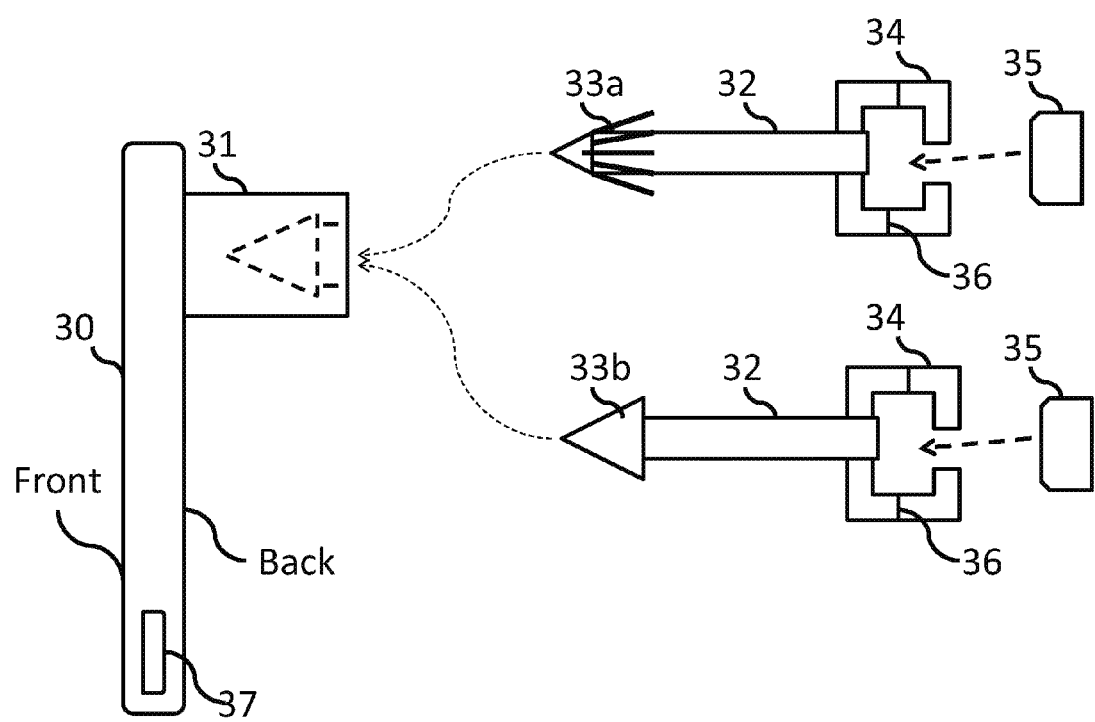
FIG. 3 is a non-limiting diagram showing the display panel with an asymmetrically positioned display-connector on the back side and two configurations of the shaft with shaft-connector and arm-connector.

FIG. 3 is a non-limiting diagram showing the display panel with an asymmetrically positioned display-connector on the back side and two configurations of the shaft with shaft-connector and arm-connector. The display-connector affixes the shaft to the display panel, the display-connector comprising the connector positioned on the display panel backside. The shaft-connector and the display-connector are configured to lock together after one is connected to the other, preventing separation of the display panel from the shaft during motion of the automotive wiper arm. The arm-connector is configured to clasp the automotive wiper arm and maintain sufficient pressure to avoid rotation of the shaft around and generally perpendicular to the automotive wiper arm.

Figure 4:
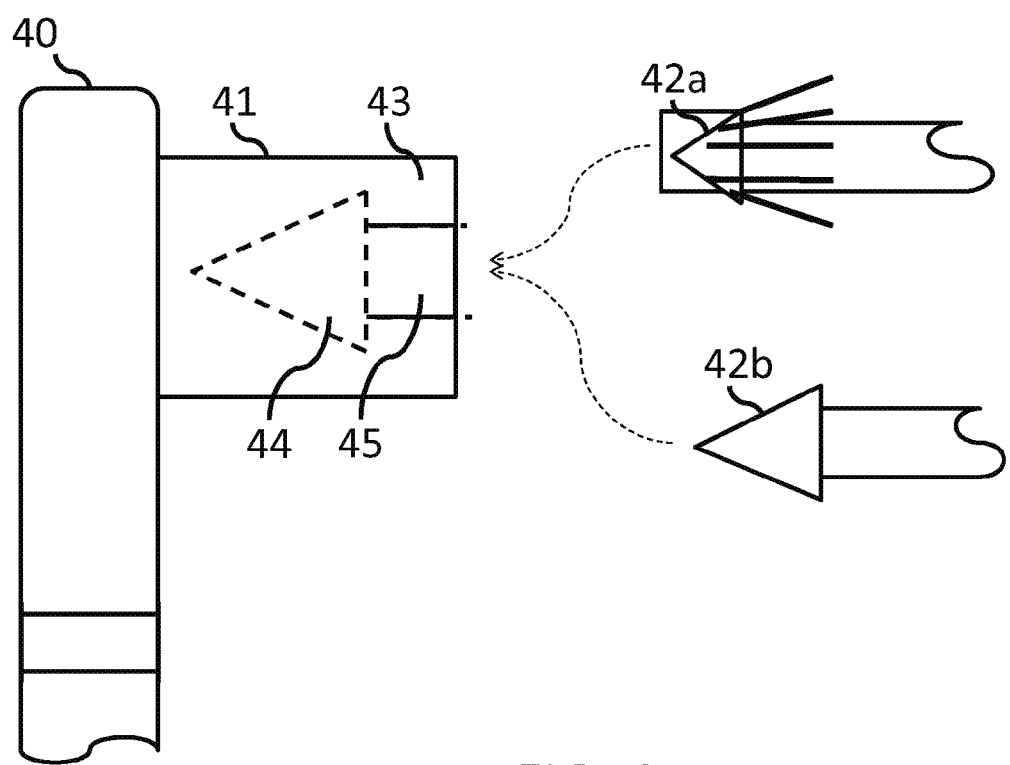
FIG. 4 is a diagram showing a non-limiting cross-section of a display-connector positioned on the back side of the display panel.

FIG. 4 is a non-limiting diagram showing the cross-section of the display-connector on the back side of the display panel. The display-connector is conical in shape and configured to receive the shaft-connector. The display-connector further comprises an integrated base ring situated at the base dimension of the conical shaped receptor, the base ring having an inner circular opening with a diameter less than the base diameter of the conical shaped receptor.

Figure 5:
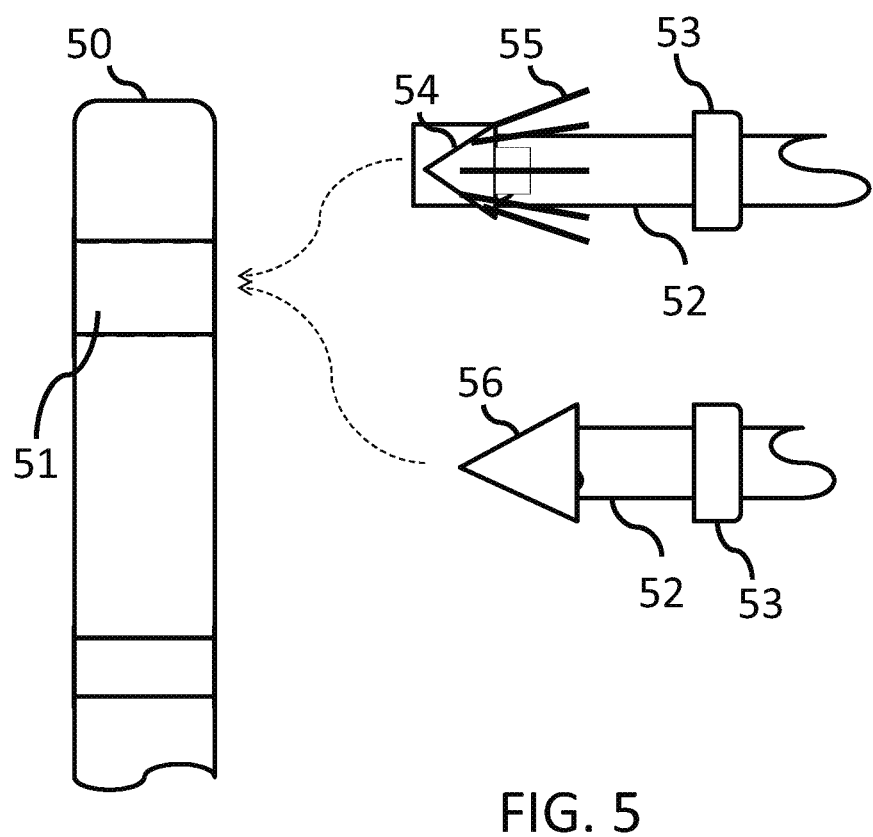
FIG. 5 is a diagram showing a non-limiting cross section of a display-connector penetrating through the display panel and a configuration of the shaft with a diameter enlargement providing a stop for the display panel.

FIG. 5 is a non-limiting diagram showing the cross section of a display-connector penetrating through the display panel and a configuration of the shaft with a diameter enlargement providing a stop for the display panel. The shaft is shown configured with a conical shaped tip having an apex at a forward end situated away from the shaft and a plurality of flexible tip extenders divided from each other and extending angularly back toward the shaft and away from the conical shaped tip, the plurality of point extenders configured in a conical shape having an apex comprised of the conical shaped tip and a base diameter at outer ends of the point extenders greater than a shaft diameter at the point where the first rotation-point connector and the shaft are fastened together.

Figure 6:
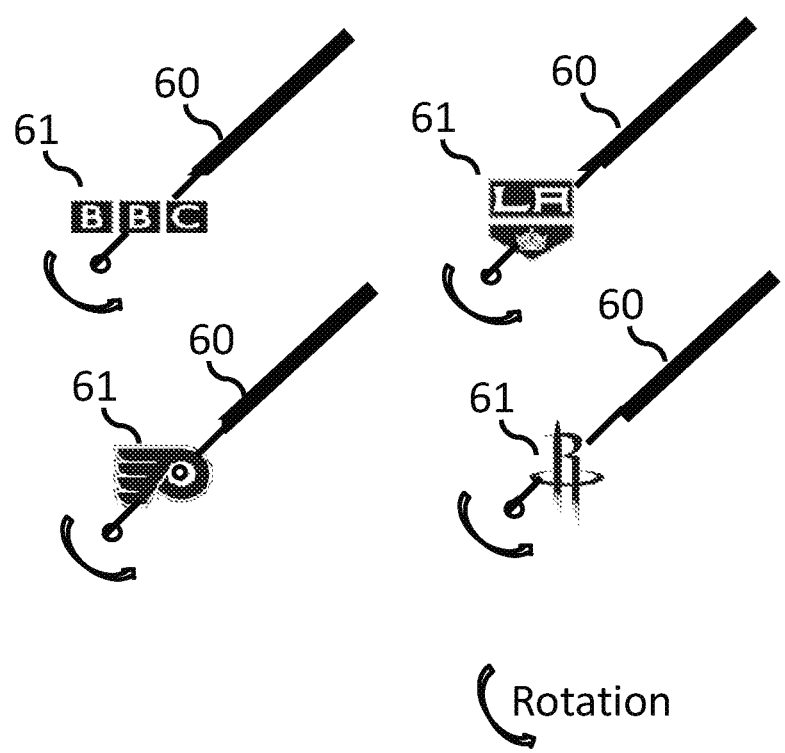
FIG. 6 is a diagram showing four non-limiting examples of display panels of various shapes each mounted on an automotive wiper arm.

FIG. 6 is a non-limiting diagram showing four examples of display panels of various shapes each mounted on an automotive wiper arm. The display panels are shown relatively level with respect to the ground while the wiper arm is rotating from right to left.

Figure 7:
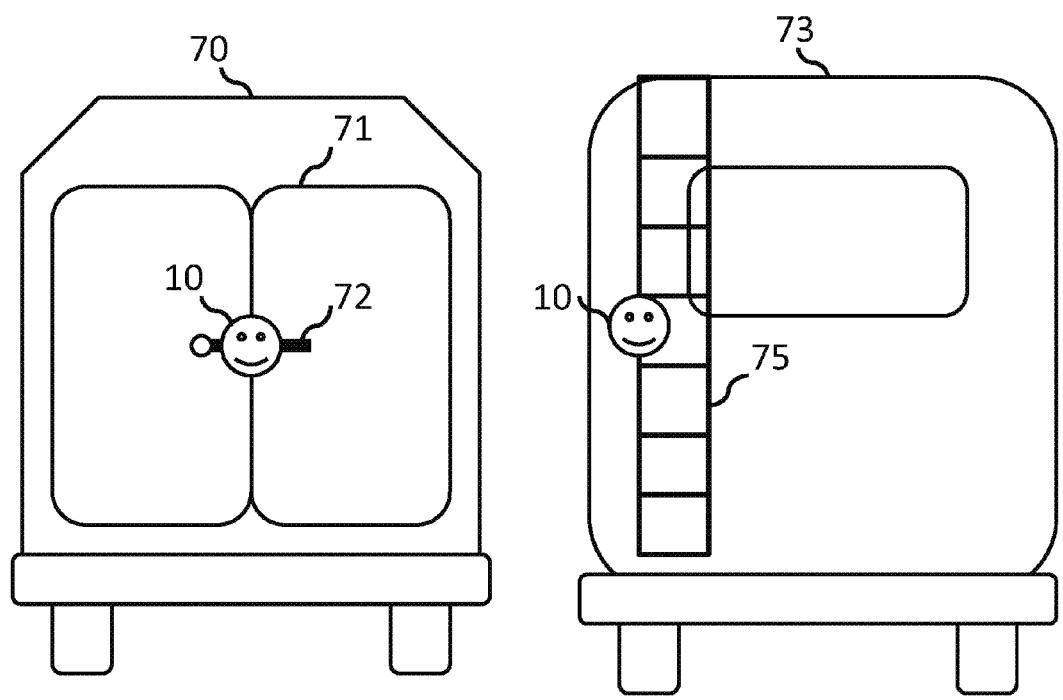
FIG. 7 is a non-limiting diagram showing the apparatus of the present invention mounted on other attachment points of an automotive vehicle.

FIG. 7 is a non-limiting diagram showing the apparatus of the present invention mounted on other attachment points of an automotive vehicle. The arm-connector of the shaft positioned on the back-side of the display panel (see FIG. 2) is configured to clasp the attachment points and maintain sufficient pressure to avoid rotation of the shaft around and generally perpendicular to the automotive wiper arm.

Figure 8A:
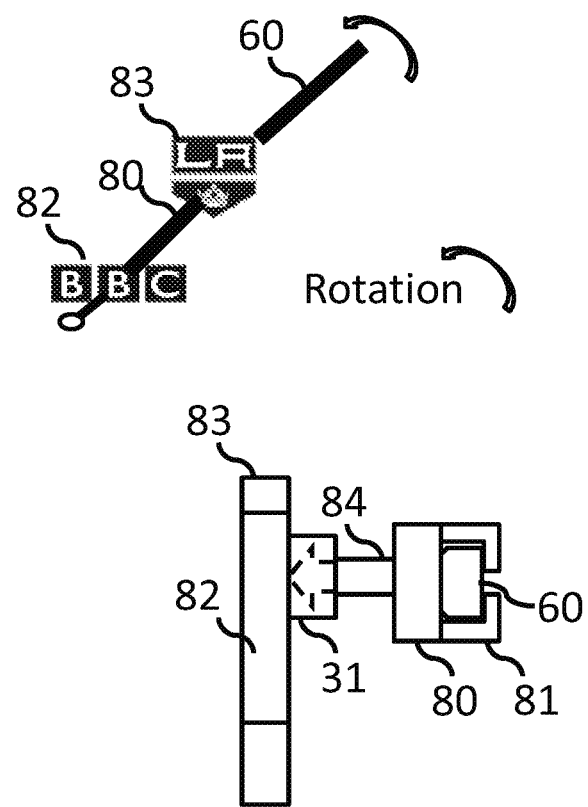
FIG. 8A is a non-limiting diagram showing the apparatus of the present invention mounted on a wiper arm and configured with two display panels.

FIG. 8A is a non-limiting diagram showing the apparatus of the present invention mounted on a wiper arm and configured with two display panels. An end-view of a dual shaft connector bar is presented showing one of two arm-connectors attached to a wiper arm also shown in end-view.

Figure 8B:
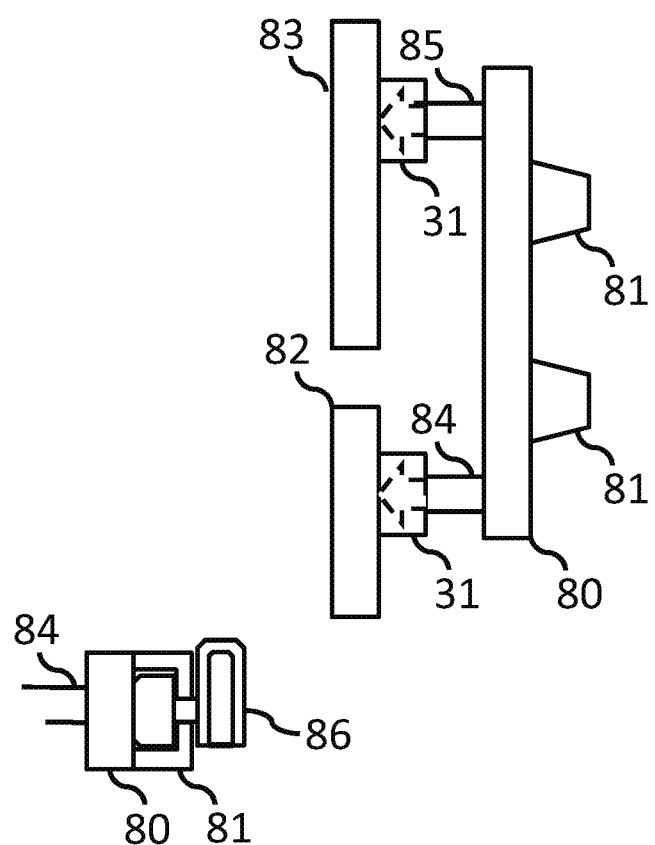
FIG. 8B is a non-limiting diagram showing a top-view of a dual shaft connector bar with shaft connectors inserted into display-connectors positioned on the back side of two display panels; a connector adaptor is also shown.

FIG. 8B is a non-limiting diagram showing a top-view of a dual shaft connector bar with shaft connectors inserted into display-connectors positioned on the back side of two display panels. The dual shaft connector bar is also shown in end-view with a connector adaptor inserted into one of two arm connectors, the second arm connector not being visible in the end-view. The connector adaptor may be used to adapt the arm-connector to various attachment points on an automotive vehicle.

Figure 9:
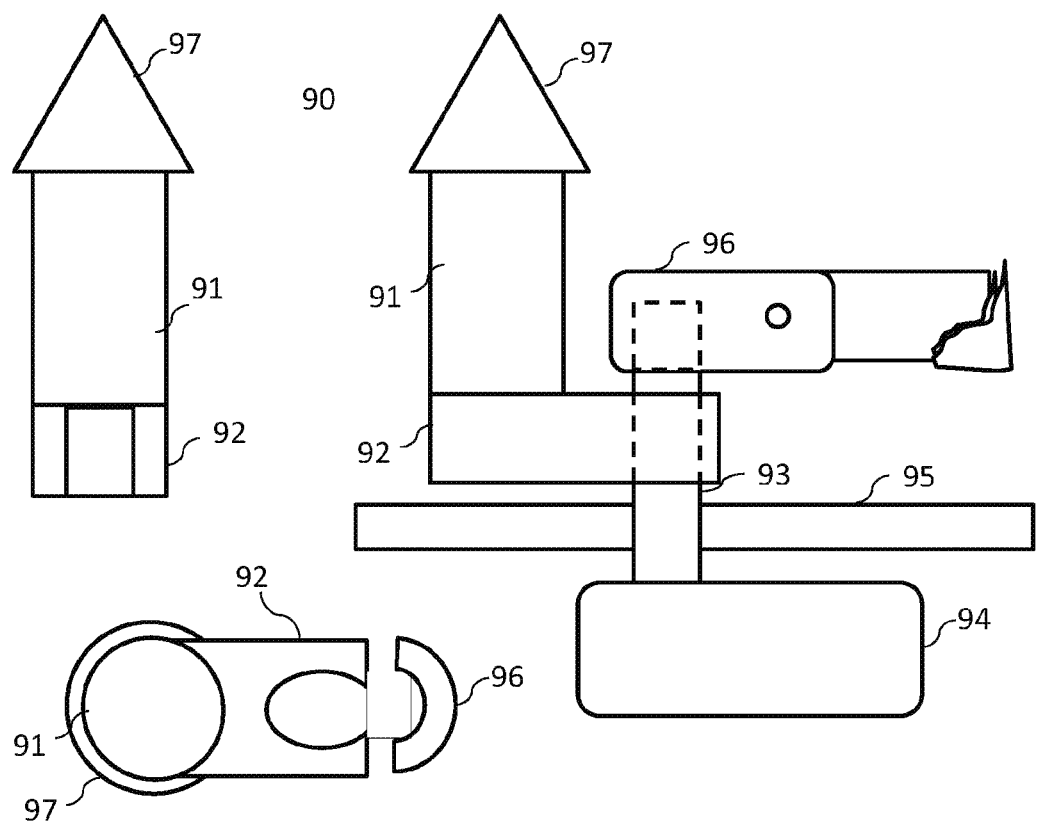
FIG. 9 is a non-limiting diagram showing a right-angled shaft configuration with shaft-connector and a snap-connector for connecting to a wiper motor shaft.

FIG. 9 is a non-limiting diagram showing a right-angled shaft configuration with shaft-connector and a snap-connector for connecting to a wiper motor shaft. The right-angled shaft is shown connected to a wiper motor shaft in a location between the wiper motor and the point of wiper arm attachment to the wiper motor shaft. The right-angled shaft configuration may be used to mount relatively heavier and larger size display panels without impeding wiper arm rotational motion.

Figure 10:
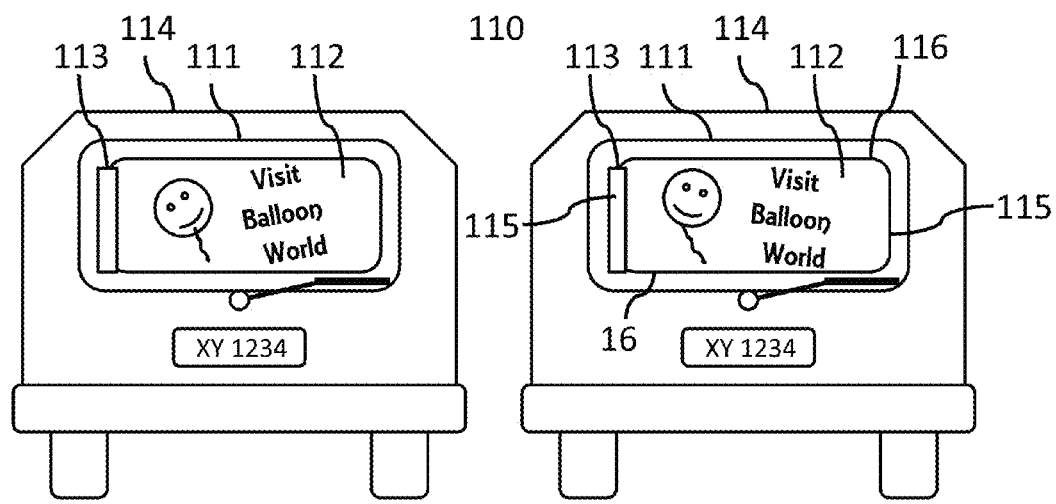
FIG. 10 is a non-limiting diagram showing the display panel of the present invention as it may typically be positioned in a window cavity located on the rear of an automotive vehicle.

FIG. 10 is a non-limiting diagram showing the display panel of the present invention as it may typically be positioned in a window cavity located on the rear of an automotive vehicle. As shown, the physical dimensions of the display panel generally conform to the shape of the window cavity, but may not completely fill it. Other shapes are anticipated, depending on a specific use of the display and the configuration of the window cavity. The content may be dynamically presented on the display panel as shown from left to right in FIG. 10.

Figure 11:
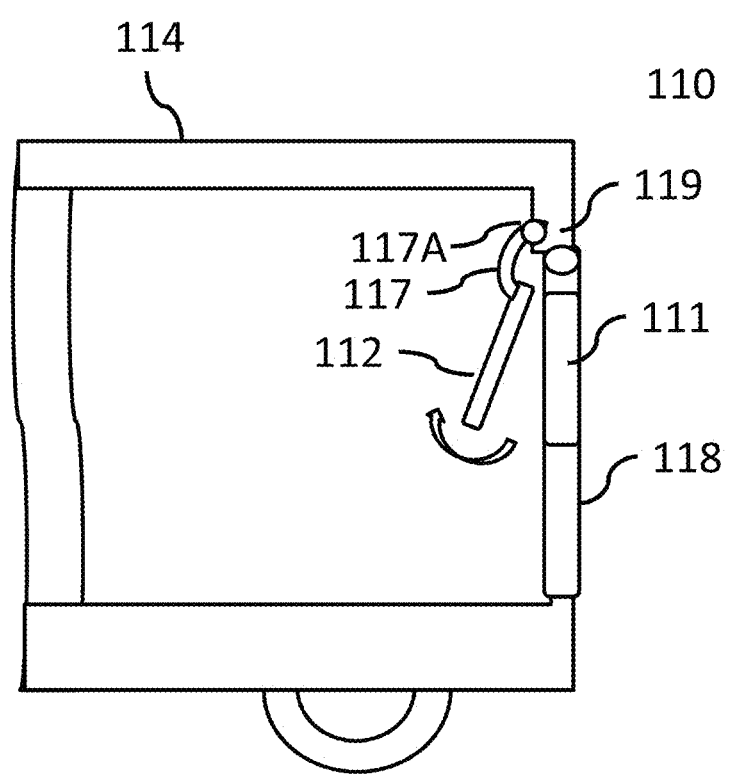
FIG. 11 is a non-limiting diagram showing the display panel of the present invention as it may typically be mounted on a rotating assembly for positioning in-line with a window cavity located on the rear of an automotive vehicle and the displayed content may be dynamic.

FIG. 11 is a non-limiting diagram showing the display panel of the present invention as it may typically be mounted on a rotating assembly for positioning in-line with a window cavity located on the rear of an automotive vehicle and the displayed content may be dynamic. The rotating assembly may mount above the window cavity for repositioning the display into and out of the window cavity. Other mounting positions are anticipated.

Figure 12:
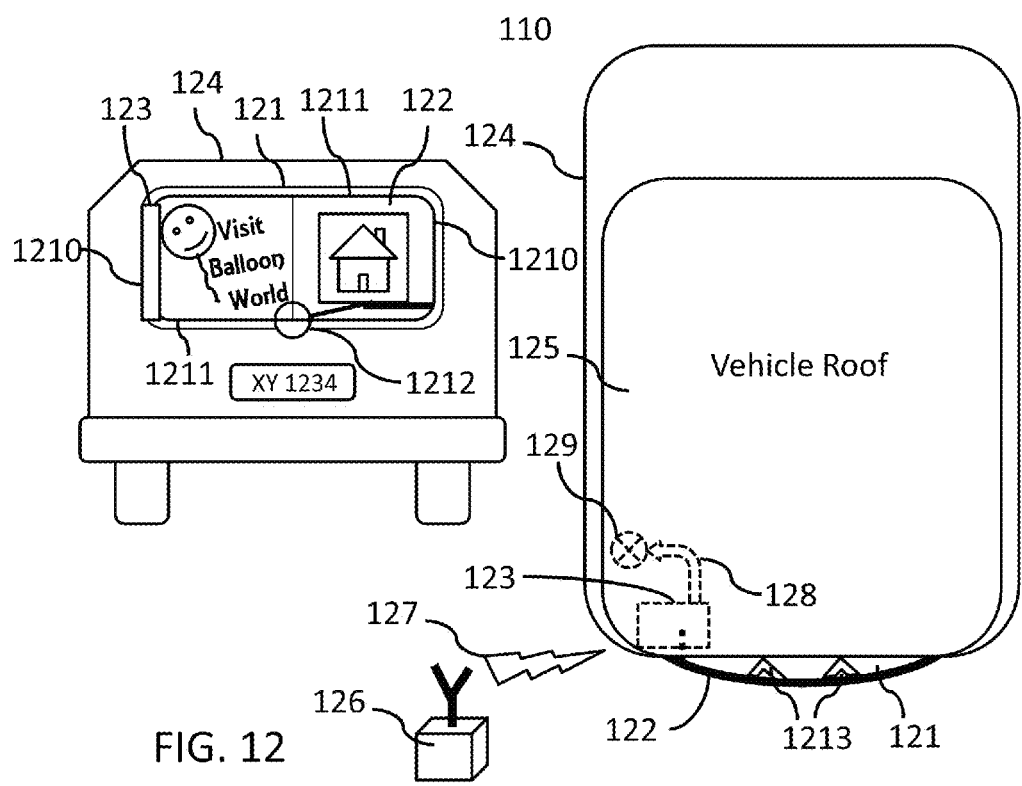
FIG. 12 is a non-limiting diagram showing the display panel of the present invention as it may typically be positioned in a window cavity located on the rear of an automotive vehicle, where the physical dimensions of the display panel generally conform to the shape of the window cavity with the viewable image area substantially filling the interior dimension of the window cavity of the automotive vehicle.

FIG. 12 is a non-limiting diagram showing the display panel in one aspect of the present invention as it may typically be positioned in a window cavity located on the rear of an automotive vehicle. As shown, the physical dimensions of the display panel generally fill and conform to the shape of the window cavity and the viewable image area substantially fills the interior dimension of the window cavity of the automotive vehicle. The display is conformable to adapt to substantial curvature of the window cavity and window glass.

Figure 13:
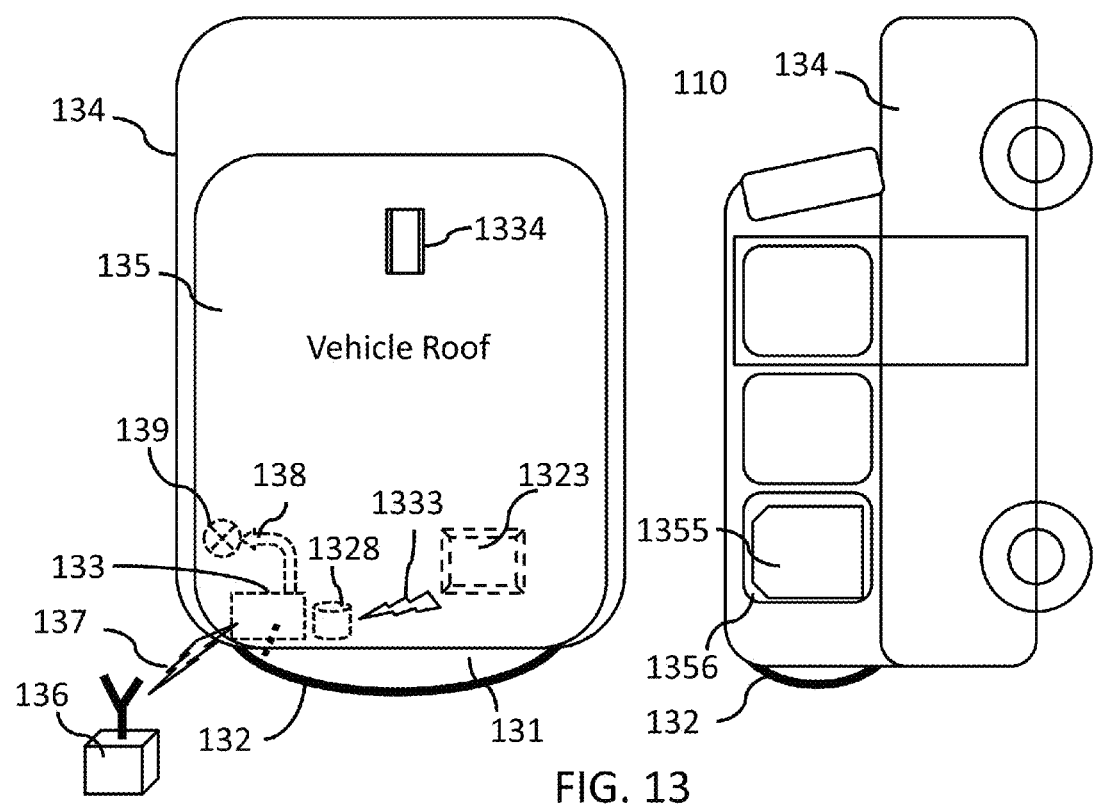
FIG. 13 is a non-limiting diagram showing the viewable surface of the display panel substantially conformable to curvature of window glass occupying the window cavity of the automotive vehicle.

FIG. 13 is a non-limiting diagram in one aspect of the present invention showing the viewable surface of the display panel substantially conformable to curvature of window glass occupying the window cavity of the automotive vehicle. The digital images may be displayed so that they appear to a viewer to have a three dimensional characteristic. A display panel configured for a side window is also shown.

Figure 14:
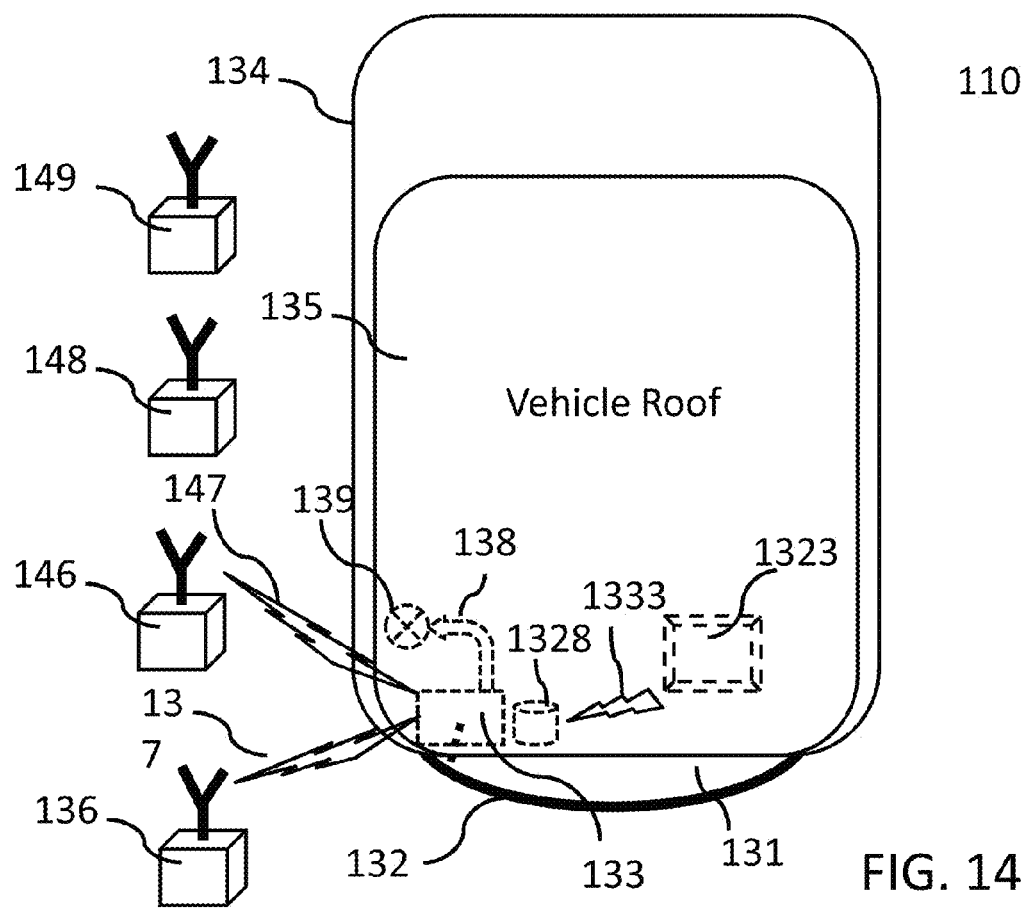
FIG. 14 is a non-limiting diagram showing the electronic display apparatus of the present invention configurable to display digital images received wirelessly from at least one remote device and retain the digital images in a storage device connectable to the display panel or the control device, and the viewable surface of the display panel substantially conformable to curvature of window glass occupying the window cavity of the automotive vehicle.

FIG. 14 is a non-limiting diagram showing the electronic display apparatus of the present invention configurable to display digital images received wirelessly from at least one remote device and retain the digital images in a storage device connectable to the display panel or the control device, the display panel configured for relatively high resolution of the digital images displayed, and the viewable surface of the display panel substantially conformable to curvature of window glass occupying the window cavity of the automotive vehicle. The electronic display apparatus is connectable to the electrical system of the automotive vehicle.

Figure 15:
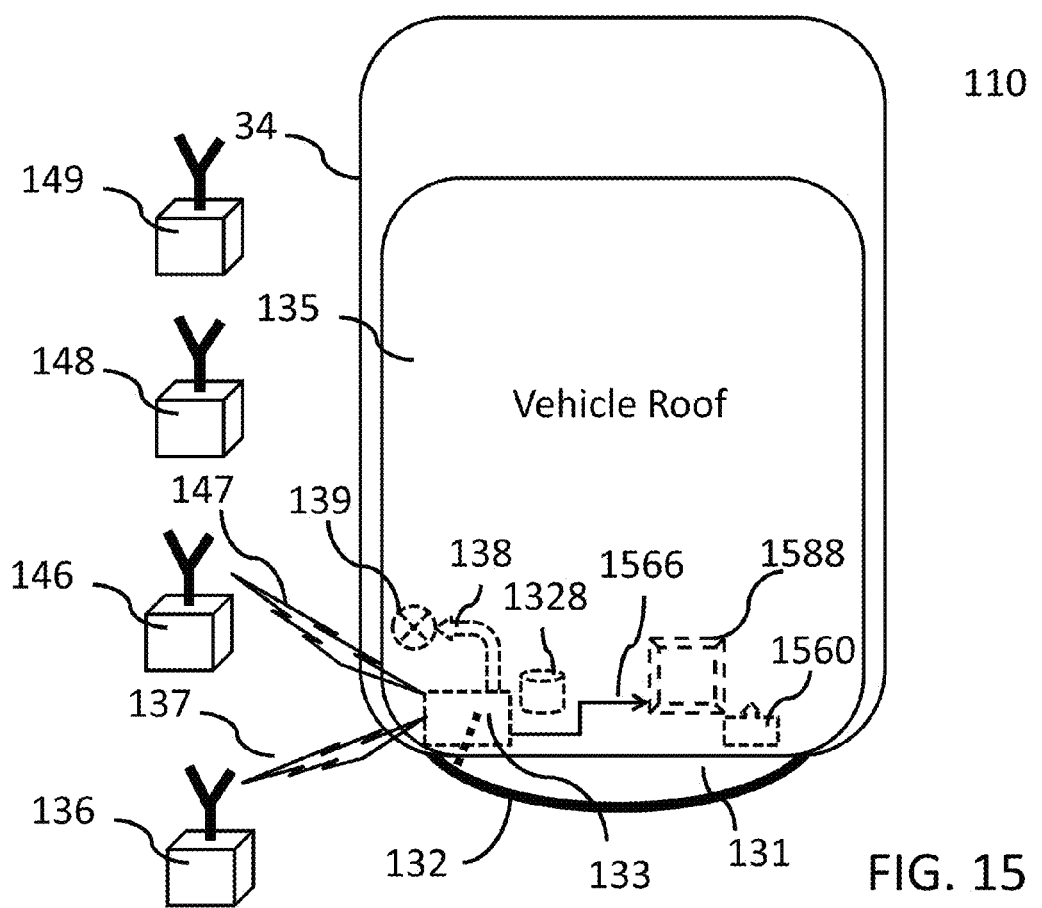
FIG. 15 is a non-limiting diagram showing the electronic display system of the present invention comprising a conformal digital display installable on a surface structure of an automotive window glass, a control device for wireless receiving of textual content, digital images and control instructions, a storage device for at least temporarily retaining textual content, digital image files and control instructions, a locator device for determining the location of the electronic display system, and a vehicle interface for interconnection with the automotive vehicle.

FIG. 15 is a non-limiting diagram showing the electronic display system of the present invention comprising a conformal digital display installable on a surface structure of an automotive window glass, a control device for wireless receiving of textual content, digital images and control instructions from a plurality of remote devices, a storage device for at least temporarily retaining digital image files and control instructions, a locator device for determining the location of the electronic display system, and a vehicle interface for interconnection with the automotive vehicle.

Figure 16:
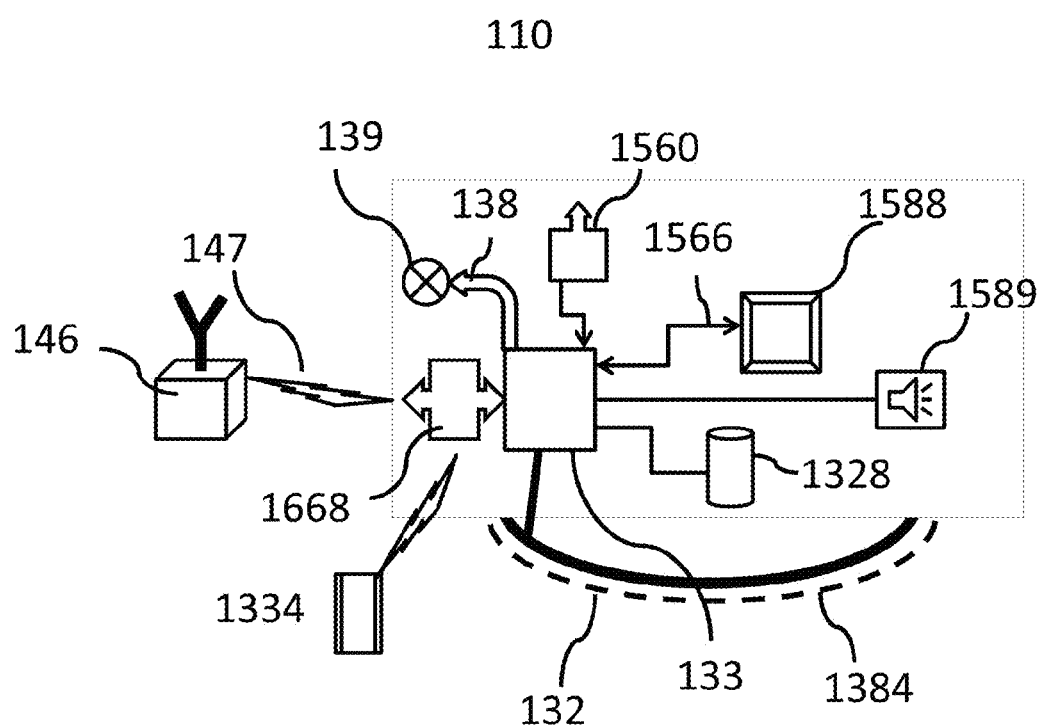
FIG. 16 is a non-limiting diagram showing interconnection between various components in one embodiment of the present invention, including the display panel, the control device, the storage device, the locator device, the transmitter, and the vehicle interface.

FIG. 16 is a diagram showing interconnection between various components of one aspect of the present invention, including the display panel, the control device, the storage device, the locator device, the transmitter, and the vehicle interface. The control device may communicate with at least one remote device positioned in a specific location onboard or external to the automotive vehicle.

Figure 17:
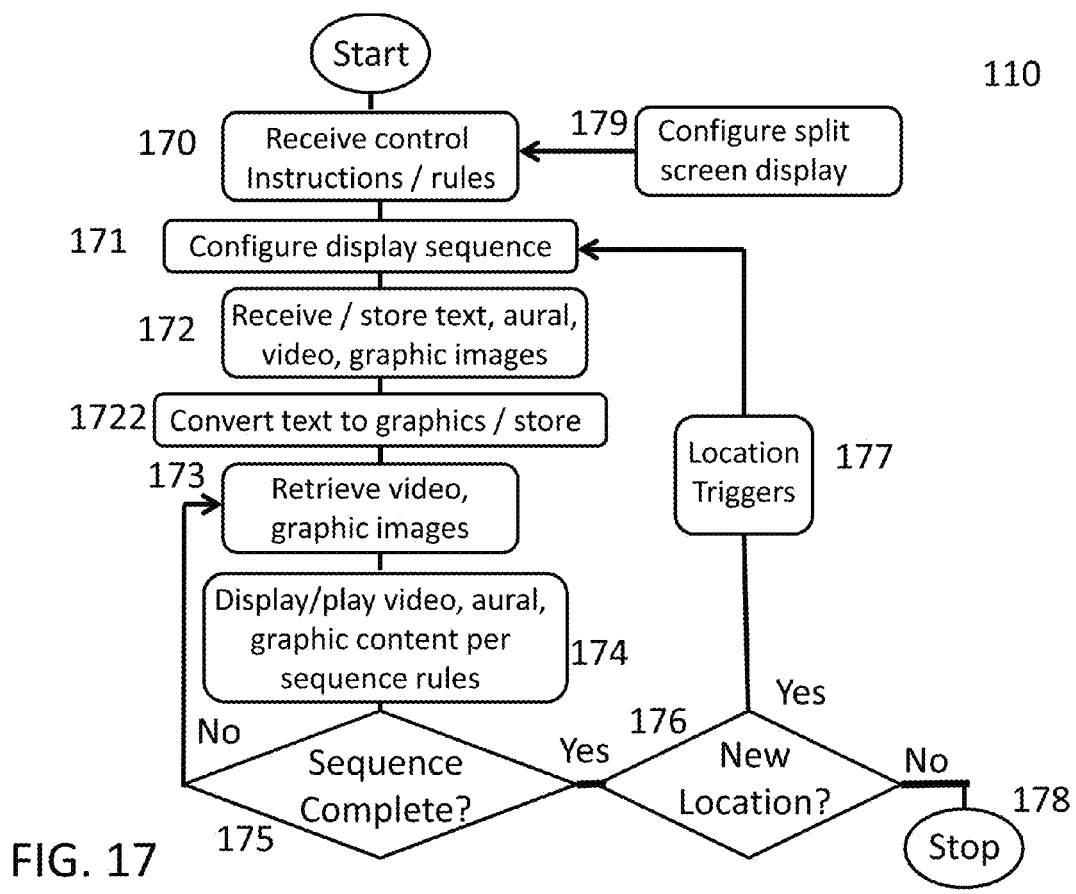
FIG. 17 is a non-limiting diagram showing top level command sequencing for the control device of the present invention, the command sequencing being the determinant of the presentation and display timing of text, video, and graphic images (e.g., advertising content).

FIG. 17 is a non-limiting diagram showing top level command sequencing for the control device of the present invention, the command sequencing being the determinant of the presentation and display timing of text, video, and graphic images (e.g., advertising content). Command sequence events are embedded in the application code operable on the control device. Command sequence and location triggers may also govern receipt of text, video, graphic images, and aural content from remote devices located onboard or external to the automotive vehicle.

Figure 18:
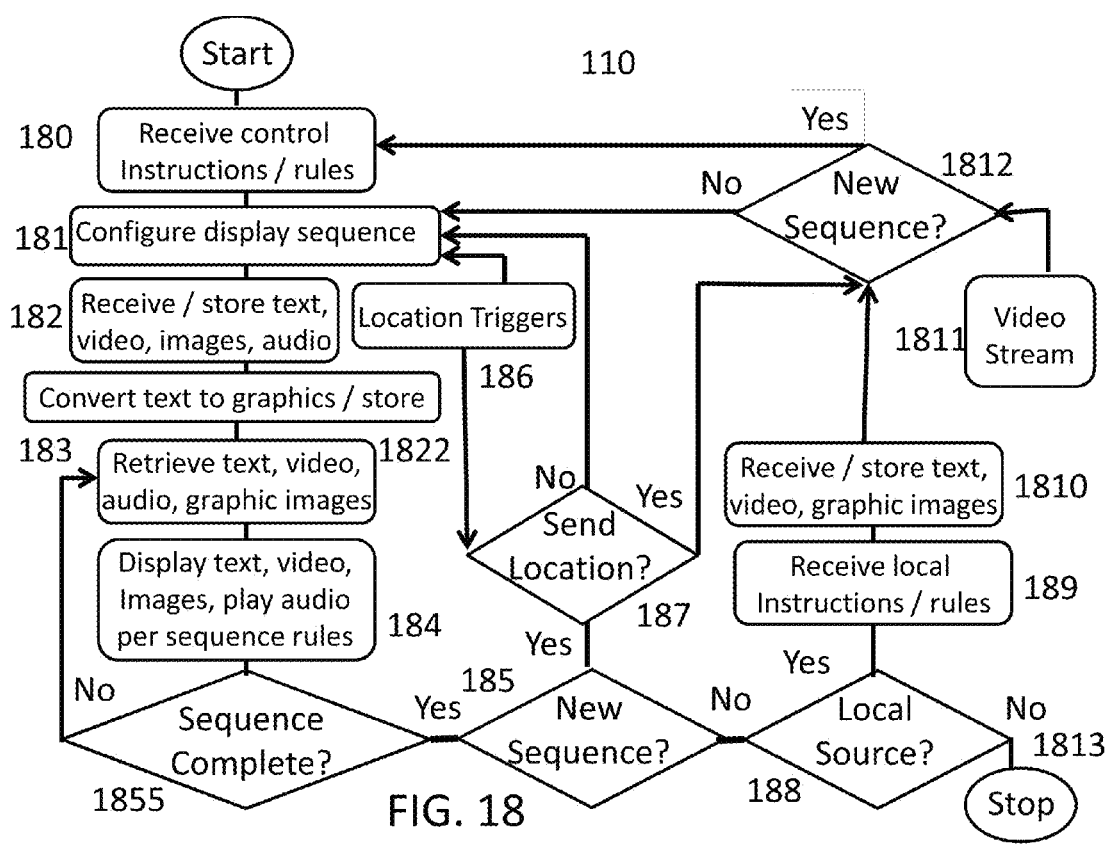
FIG. 18 is a non-limiting diagram showing top level command sequencing for the control device of the present invention, the command sequencing and location triggers being the determinant of the presentation, content, and display timing of text, video, graphic images (e.g., advertising content), streaming video, and associated audio reproduction. Command sequence events are embedded in the application code operable on the control device.

FIG. 18 is a non-limiting diagram showing top level command sequencing for the control device of the present invention, the command sequencing and location triggers being the determinant of the presentation and display timing of text, video, and graphic images (e.g., advertising content). Command sequence events are embedded in the application code operable on the control device. Command sequence events may also govern receipt of text, video, and graphic images from remote devices. Command sequence events may alter screen configuration of the display panel to simultaneously display text, graphics, and video, including streaming video.

Command sequence events may also govern conversion of textual content to user determined graphic format for display as a graphical image.

Figure 19:
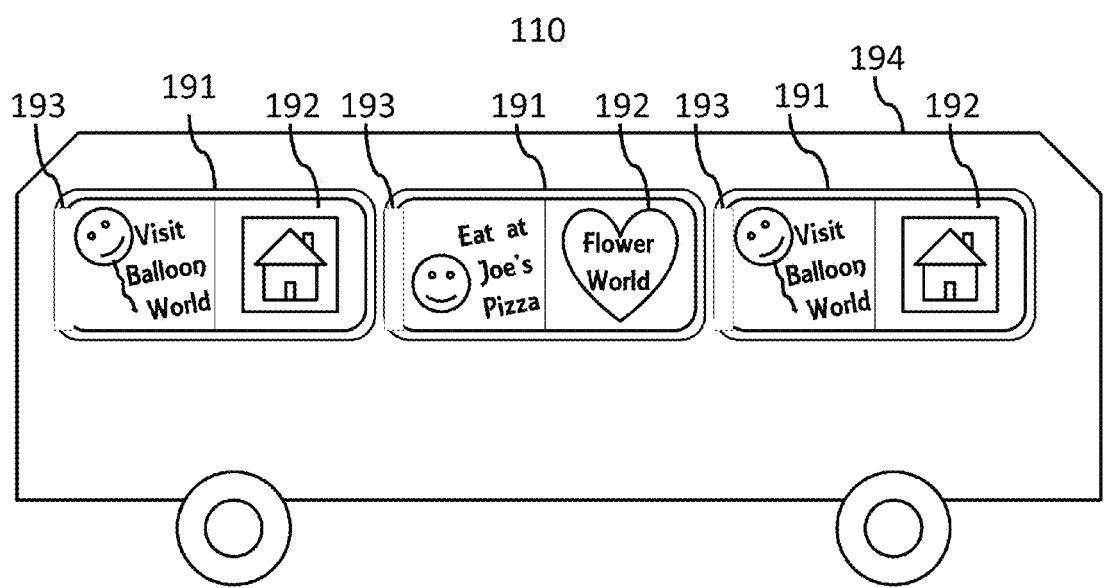
FIG. 19 is a non-limiting diagram showing the display panel in one embodiment of the present invention as it may typically be positioned in a window cavity located on an automotive vehicle, where the automotive vehicle may be a bus as typically used in public transportation services or a rail car as may be used in surface and rail transportation systems.

FIG. 19 is a non-limiting diagram showing the display panel in one embodiment of the present invention as it may typically be positioned in a window cavity located on an automotive vehicle, where the automotive vehicle may be a bus as typically used in public transportation services or a rail car as may be used in surface and rail transportation systems. As shown, the physical dimensions of the display panel generally fill and conform to the shape of the window cavity and the viewable image area substantially fills the interior dimension of the window cavity of the automotive vehicle.

Figure 20:
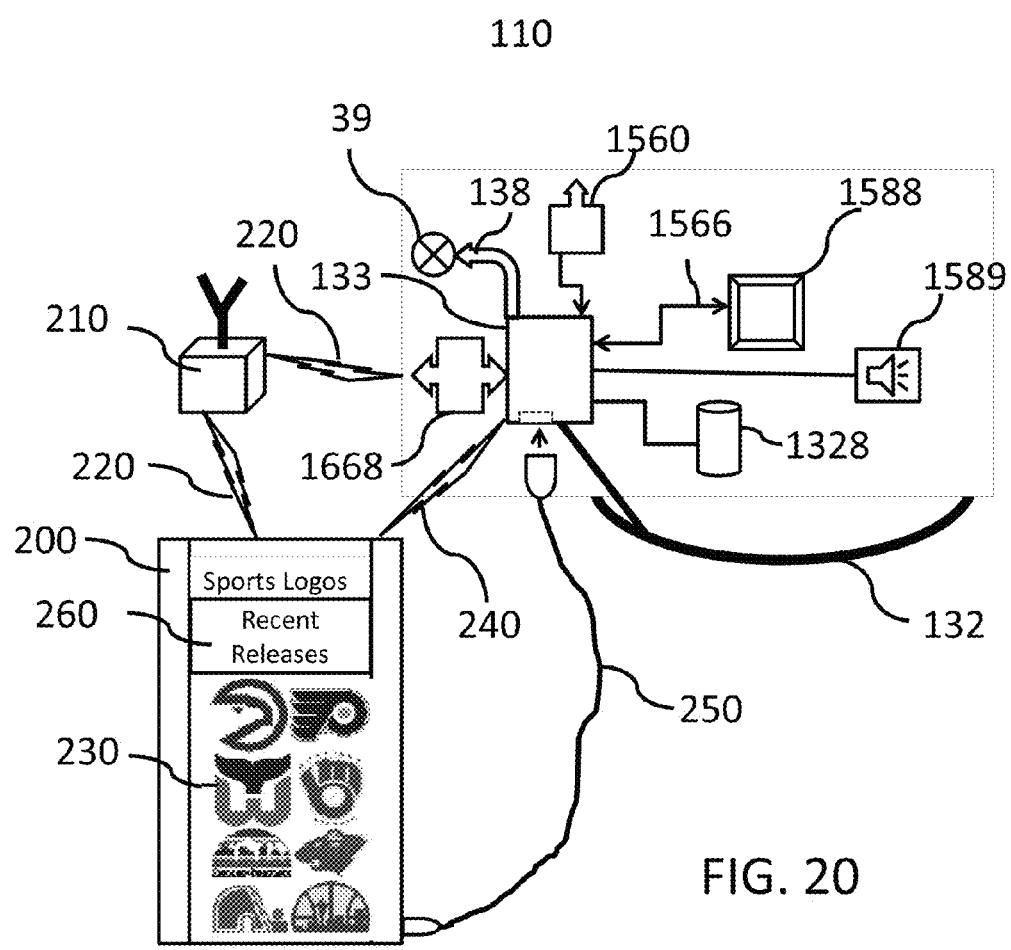
FIG. 20 is a non-limiting diagram showing the electronic display apparatus of the present invention configurable to receive a plurality of content types from at least one remote device in response to a user initiated purchase of said content from the at least one remote device using an electronic ordering and payment interface affiliated with said remote device.

FIG. 20 is a non-limiting diagram showing the electronic display apparatus of the present invention configurable to receive a plurality of content types from at least one remote device in response to a user initiated purchase of said content from the at least one remote device using an electronic ordering and payment interface affiliated with said remote device. As shown, a mobile communication device may be used to connect to a remote device configured to provide digital content comprising at least graphic images and video. The digital content may be received by the control device as part of completion of a payment transaction.

Figure 21:
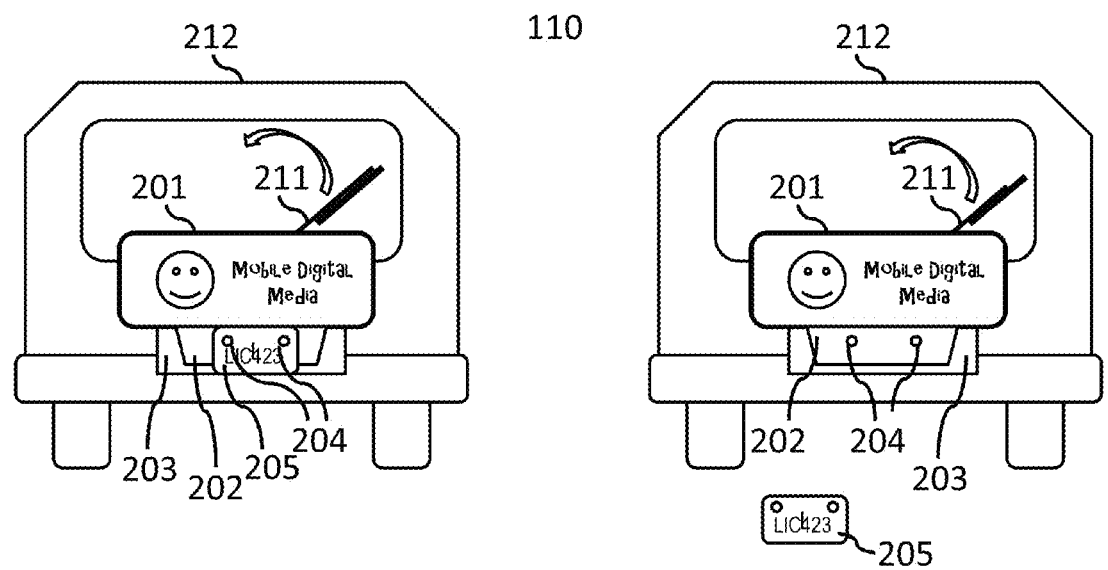
FIG. 21 is a non-limiting diagram showing the conformal digital display panel of the present invention installable on a flat or curved structure of a frame mountable on the rear portion of an automotive vehicle.

FIG. 21 is a non-limiting diagram showing the conformal digital display panel of the present invention installable on a flat or curved structure of a frame mountable on the rear portion of an automotive vehicle. The mounting positions for the frame may be those intended for a license plate, along with an attachment to the rear windshield wiper assembly.

Figure 22:
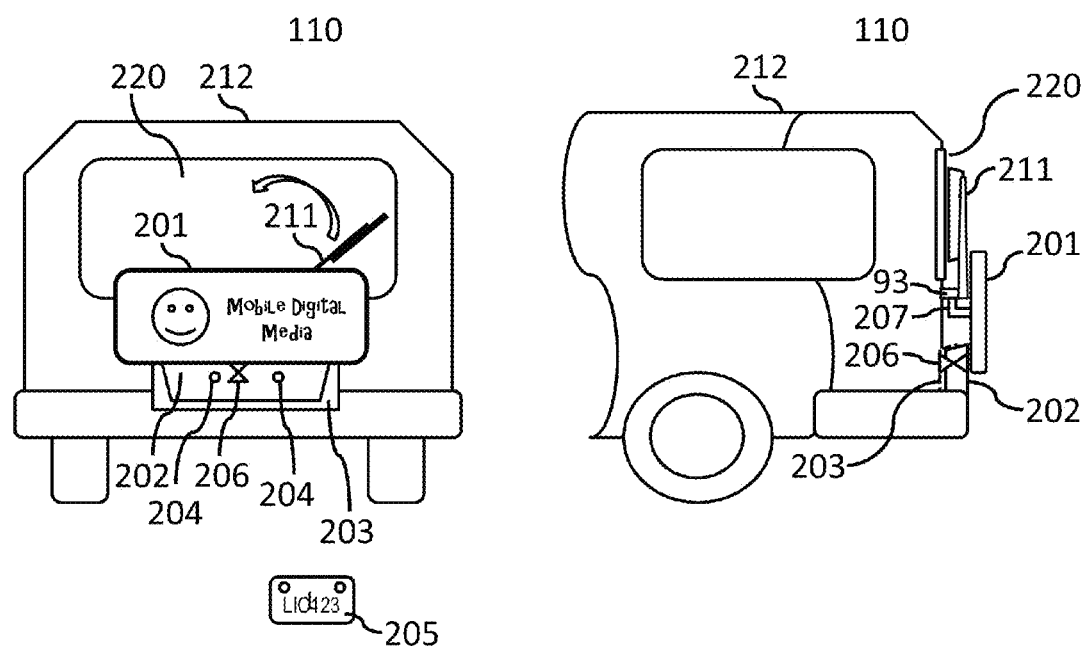
FIG. 22 is a non-limiting diagram showing the conformal digital display panel of the present invention installable on a flat or curved structure of a frame mountable on the rear portion of an automotive vehicle as viewed from both the rear and side of the automotive vehicle.

FIG. 22 is a non-limiting diagram showing the conformal digital display panel of the present invention installable on a flat or curved structure of a frame mountable on the rear portion of an automotive vehicle as viewed from both the rear and side of the automotive vehicle. The frame may be mountable by attaching an upper or center portion of the frame to at least a rear windshield wiper assembly using a rotational connector encompassing the wiper assembly motor shaft, where the windshield wiper assembly comprises at least a motor, a motor shaft, and a wiper arm attached to the motor shaft. The frame may be mountable by attaching a lower frame portion to connecting positions in a license plate cavity on the rear portion of the automotive vehicle.

In detail: Referring now to FIG. 1, there is shown a non-limiting schematic illustration of one embodiment of the present invention 10 illustrating how the apparatus of the present invention may typically be positioned on a wiper arm 11 of a windshield wiper system located on the rear 12 of a sport utility vehicle, and how text and graphics presented on the display panel 13 may remain relatively level during rotational motion of the wiper arm 11, provided the display-connector is position asymmetrically and/or the lower portion of the display panel 13 is weighted. If the display-connector is substantially centered on the back side of the display panel 14, and the display panel 14 is not asymmetrically weighted, the orientation of the display panel 14 and displayed text or graphics will remain substantially unchanged with respect to the wiper arm 11 as the wiper arm moves rotationally during operation of the windshield wiper system. Weighting the lower portion of the display panel 14 would tend to maintain a level orientation as shown for display panel 13.

According to a one aspect, the present invention 10 as shown in FIG. 1 provides a display device 13 mountable on an automotive wiper arm 11, comprising a display panel (FIG. 2, 20) having a front side for presentation of text or graphics and a back side for mounting a connector. Referring to FIG. 2, an arm-connector 24 is used for affixing the display device (FIG. 1, 13) to the automotive wiper arm 25 (or alternative attachment point), and a shaft links the arm-connector 24 to the display panel 20. A shaft-connector provides for affixing the shaft 22 to the display panel 20, the shaft-connector comprising part of the shaft 22. A display-connector 21 affixes the shaft 22 to the display panel 20, the display-connector 21 comprising the connector positioned on the display panel 20 backside. Depending on the weight and/or configuration of the display panel, more than one arm connector may be needed and employed.

In other aspects of the present invention, the display-connector 21 may be positioned on the backside of the display panel 20 as needed to fit the shape of the display panel 20 which may be configured three dimensionally to fit the shape of text or graphics to be presented. The display panel may be fabricated using a translucent material suitable for illumination using light emitting diodes (LED) powered by a battery installed in the shaft or internally in the display panel. Depending on the weight and/or configuration of the display panel, more than one display connector may be needed and employed.

In another aspect of the present invention, the display panel 20 may comprise a digital display enabling dynamic presentation or reconfiguration of text and/or graphics on the display panel 20, and which digital display 20 may be powered by an internal battery, connection to the vehicle electrical system, solar cells mounted on the display panel 20, or a combination of these power sources.

Referring now to FIG. 2, there is shown a non-limiting schematic illustration of one embodiment of the present invention showing the display panel 20 with a display-connector 21 positioned substantially centered on the back side and two different configurations of the shaft 22 with shaft-connectors 23a and 23b and arm-connector 24. The display-connector 21 affixes the shaft 22 to the display panel 20, the display-connector 21 accepting the shaft-connector. The shaft-connectors 23a and 23b and the display-connector 21 are configured to lock together after one is connected to the other, preventing separation of the display panel 20 from the shaft 22 during motion of an automotive wiper arm 25 (shown in cross-section) to which it may be attached by the arm-connector 24. The arm-connector 24 is configured to clasp an automotive wiper arm 25 or other connection point on an automotive vehicle and maintain sufficient pressure to avoid rotation of the shaft 22 around and generally perpendicular to the automotive wiper arm 25 or other connection point. Locking fasteners 26 may also be optionally used to help secure the arm-connector 24 to an automotive wiper arm 25.

In another aspect of the present invention, the shaft 22 and arm-connector 24 may be comprised of relatively rigid plastic material, such as No. 2 durable plastic, having a total length in the range of 3 to 6 inches, and a shaft diameter in the range of 0.5 to 1.0 inch. In another aspect of the present invention, the shaft-connectors 23a or 23b, arm-connector 24, and shaft 22 may be configured from molded plastic as a single piece. The shaft may be configured to accept a battery.

Referring now to FIG. 3, there is shown a non-limiting schematic illustration of one embodiment of the present invention showing the display panel 30 with an asymmetrically positioned display-connector 31 on the back side and two configurations of the shaft 32 with shaft-connectors 33a and 33b and arm-connector 34. The display-connector affixes the shaft 32 to the display panel 30, the display-connector 31 accepting the shaft-connector. The shaft-connectors 33a and 33b and the display-connector 31 are configured to lock together after one is connected to the other, preventing separation of the display panel 30 from the shaft 32 during motion of an automotive wiper arm 35 (shown in cross-section) to which it may be attached by the arm connector 34. The arm-connector 34 is configured to clasp an automotive wiper arm 35 and maintain sufficient pressure to avoid rotation of the shaft 32 around and generally perpendicular to the automotive wiper arm 35 as a result of airflow pressure on the display panel during vehicular motion. The shape of the arm-connector 34 may be configured in shapes that closely fit the cross-sectional shape of various models of automotive wiper arms 35. Locking fasteners 36 may also be used to help secure the arm-connector 34 to an automotive wiper arm 35.

In another aspect of the present invention referring to FIG. 3, the shaft-connectors 33a and 33b and the display-connector 31 may be rotation-point connectors configured to allow the display panel 30 to rotate on the shaft 32. Asymmetric mounting and use of rotation point connectors serves to maintain orientation of the text or graphics present on the display panel relatively level with respect to the ground during rotational movement of the automotive wiper arm 35. Optionally, a weight 37 may be incorporated on or into the lower portion of the display panel substantially opposite the display-connector 31 to create a righting moment during rotational movement of the automotive wiper arm 35.

In another aspect of the present invention, the shaft 32 and arm-connector 34 may be comprised of relatively rigid plastic material, such as No. 2 durable plastic, having a total length in the range of 3 to 6 inches, and a shaft diameter in the range of 0.5 to 1.0 inch.

In another aspect of the present invention, the shaft-connectors 33a or 33b, arm-connector 34, and shaft 32 may be configured from molded plastic as a single piece.

Referring now to FIG. 4, there is shown a non-limiting schematic illustration of one embodiment of the present invention showing the cross-section of the display-connector 41 asymmetrically mounted on the back side of the display panel 40. The display-connector 41 is internally conical in shape and configured to receive the shaft-connector 42a or 42b. The display-connector 41 further comprises an integrated base ring 43 situated at the base dimension of the conical shaped receptor 44, the base ring having an inner circular opening 45 with a diameter less than the base diameter of the conical shaped receptor 44.

In another aspect of the present invention, the display panel 40 is comprised of a plastic material and may be configured with raised ridges on the backside to stiffen the display panel 40, the raised ridges radiating out from the display-connector 41. The display panel 40 may also be shaped three dimensionally to substantially conform to the shape of text and/or graphics presented on said display panel 40. The display panel 40 may comprise light reflective material. The display panel 40 may comprise translucent material suitable for internal illumination.

Referring now to FIG. 5, there is shown a non-limiting schematic illustration of one embodiment of the present invention showing the cross section of a display-connector 51 penetrating through the display panel 50 and a configuration of the shaft 52 with a diameter enlargement 53 providing a stop for the display panel 50. The shaft 52 is shown configured with a conical shaped tip 54 having an apex at a forward end situated away from the shaft 52 and a plurality of flexible tip extenders 55 divided from each other and extending angularly back toward the shaft 52 and away from the conical shaped tip 54, the plurality of tip extenders 55 configured in a conical shape having an apex comprised of the conical shaped tip 54 and a base diameter at outer ends of the tip extenders 55 greater than a shaft 52 diameter at the point where the display-connector and the shaft 52 are fastened together. A shaft 52 is also shown configured with the diameter enlargement 53 and a conical tip connector 56 having a base diameter sized to permit an initial insertion and connection to be made with the display-connector 51, and sufficiently larger than the diameter of the display-connector 51 to maintain the connection during operation of a windshield wiper system. The display panel 50 may be shaped to substantially conform to the shape of text and/or graphics presented on said display panel 50.

In another aspect of the present invention, the display panel 50 may be comprised of semi-flexible plastic material and may have a thickness in the range of 0.25 inches to 0.75 inches, the thickness being needed to maintain shape of the display panel 50 depending on the stiffness characteristics of the semi-flexible plastic and the shape of the display panel 50.

In another aspect of the present invention, the display panel 50 may be comprised of relatively rigid plastic material having a thickness in the range of 0.2 inches to 0.6 inches, the thickness being needed to maintain shape of the display panel 50 depending on the stiffness characteristics of the rigid plastic and the shape of the display panel 50. The Display panel 40 may comprise light reflective material. The display panel 40 may comprise translucent material suitable for internal illumination.

Referring now to FIG. 6, there is shown a non-limiting schematic illustration of one embodiment of the present invention showing four examples of display panels of various shapes each mounted on an automotive wiper arm 60. The display panels 61 are shown relatively level with respect to the ground while the wiper arm 60 is rotating from right to left. The display panel 61 will tend to remain relatively level during rotational motion of the wiper arm 60, provided the display-connector is connected as a rotation-point connector positioned asymmetrically and/or the lower portion of the display panel 61 is weighted. The display panels 61 may be shaped three dimensionally to conform substantially with the shape of the text or graphics presented, and may further comprise light reflective material or translucent. The display panel 61 and the display-connector may be configured from molded plastic as a single piece.

Referring now to FIG. 7, there is shown a non-limiting diagram of the apparatus of the present invention 10 mounted on other attachment points of two types of automotive vehicles. The vehicles shown are a panel truck 70 with swing open doors 71 having a locking lever 72 used as an attachment point; and a recreational vehicle 73 having a vertical ladder 75 used as an attachment point. Various attachment points on other types of vehicles and various configurations of the display panel of the present invention 10 are also anticipated. Attachment points may be rotational or non-rotational relative to the vehicle. Display panels may be configured in various shapes and sizes as needed to present a particular graphic or text message.

Referring now to FIG. 8A there is shown a non-limiting diagram of the apparatus of the present invention mounted on a wiper arm 60 and configured with a first display panel 82 and a second display panel 83. An end-view of a dual shaft connector bar 80 is presented showing one of two arm-connectors 81 attached to a wiper arm 60 also shown in end-view. The display-connector 31 positioned on the back of display panel 82 is shown with a shaft connector of one shaft 84 of the dual shaft connector bar 80 inserted. The second display panel 83 is shown in partial view behind the first display panel 82.

Referring now to FIG. 8B there is shown a non-limiting diagram of a top-view of a dual shaft connector bar 80 with shaft connectors inserted into display-connectors 31 positioned on the back side of a first display panel 82 and a second display panel 83. The dual shaft connector bar 80 is shown configured with two arm connectors 81. Shaft 84 connects the first display panel 82 to the dual shaft connector bar 80. Shaft 85 connects the second display panel 83 to the dual shaft connector bar 80. The dual shaft connector bar 80 is also shown in end-view with a connector adaptor 86 inserted into one of the two arm connectors 81, the second arm connector 81 not being visible in the end-view. The connector adaptor 86 may be used to adapt the arm-connector 81 to various attachment points on an automotive vehicle. A connector adaptor 86 as shown may be used to connect the dual shaft connector bar 80 to a connection point such as the top edge of a side window or a sun visor above the front wind shield on an automotive vehicle. A connector adaptor 86 as shown may also be used to adapt a shaft connector of a single shaft for attachment to a side window or sun visor of an automotive vehicle.

Referring now to FIG. 9, there is shown a non-limiting diagram of a right-angled shaft configuration with shaft 91 having a shaft-connector 97 and a snap-connector 92, the snap-connector 92 for connecting to a wiper motor shaft 93. The snap-connector 92 is shown connected to a wiper motor shaft 93 in a location between the wiper motor 94 and the point of wiper arm 96 attachment to the wiper motor shaft 93 outside the automotive vehicle exterior surface 95. The snap-connector 92 may be configured to slide onto the wiper motor shaft 93 and clasp the shaft 93 with sufficient tension to remain in position during wiper motor operation and vehicle motion. A locking strap 96 may also be employed to close the open end of the snap connector 92 and completely surround the wiper motor shaft 93. The right-angled shaft configuration may be used to mount relatively heavier and larger size display panels without impeding wiper arm rotational motion.

Referring now to FIG. 10, there is shown a non-limiting diagram of the display panel 112 of the present invention 110 as it may typically be positioned in a window cavity 111 located on the rear of an automotive vehicle 114. As shown, the physical dimensions of the display panel 112 generally conform to the shape of the window cavity 111. Other shapes are anticipated, depending on a specific use. The viewable area of the display panel 112 is substantially at eye level of a viewer outside the vehicle 114, the display panel 112 providing display of text, graphics, and video. The control device 113 is connectable to the display panel at various locations, directly as shown or positioned in an adjacent location (not visible) connected by a video cable. The control device provides wireless receiving of control instructions, as well as content that may include text, audio, streaming video and image files. The image on the display panel 112 is shown in two different orientations on side-by-side vehicles 114 representing the dynamic presentation function of the digital display 112.

In another aspect, the display panel 112 comprises a viewable image area substantially filling the interior dimension of the window cavity 111 of the automotive vehicle 114. The display panel 112 comprises at least one of a flexible or semi-flexible material to enable a conforming shape to curvature of window glass positioned in the window cavity 111, thereby being adaptable to a range of automotive vehicle configurations. The display panel 112 is mountable in the window cavity 111 using a plurality of support structures including at least one of adhesive, double-sided adhesive strips, hook and loop fasteners, clips, suction cups or an adjustable locking frame. The adjustable locking frame may be configurable to conform to the shape of the window cavity. The support structures may be positioned at the edges of the display: left and right 115, top and bottom 116. In another aspect, the adjustable locking frame may be configurable as a rotating mount for repositioning the display into and out of the window cavity as shown in FIG. 11.

Referring now to FIG. 11, there is shown a non-limiting diagram of the display panel of the present invention 110 as it may typically be mounted on a rotating frame assembly 117 for positioning the display panel 112 substantially in-line with a window cavity 111 located on the rear of an automotive vehicle 114 (cut-away view). The rotating frame assembly 117 may mount above the window cavity 111 for repositioning the display panel 112 into and out of general alignment with the window cavity 111. Other mounting positions are anticipated. The rotating frame assembly 117 may be attached to the upper portion of the rear door hatch 118 or to the upper portion of the door hatch opening 119 of the automotive vehicle 114. The rotating portion of the frame assembly 117 may be configured as a locking hinge or swivel 117A that positions the frame assembly 117 and display panel 112 substantially in-line with the window cavity 111 or rotated upward away from the window cavity 111. The locking hinge or swivel 117A may be attached using industry standard threaded fasteners.

Referring now to FIG. 12, there is shown a non-limiting diagram of the display panel 122 in one embodiment of the present invention 110 as it may typically be positioned in a window cavity 121 located on the rear of an automotive vehicle 124. As shown, the physical dimensions of the display panel 122 generally fill and conform to the shape of the window cavity 121 and the viewable image area substantially fills the interior dimension of the window cavity 121 of the automotive vehicle 124. As shown in the top view 125, the display panel 122 is conformable to substantial curvature of the window cavity 121 and mounted window glass. The display panel 122 is conformable around obstructions 1212 present in the window cavity 121 and window glass, such as a wiper assembly 1212.

In another aspect, support structures may be positioned at the edges of the display: left and right 1210, top and bottom 1211. Slideably adjustable support structures 1213 may also be positioned vertically in the window cavity 121 across the back portion of the display panel 122 to maintain desired curvature where installed on a curvilinear window glass, as shown. The support structures 1213 may be slideably configurable in length and width, and lockable in position. Locking may be accomplished by at least one of locking pins, twist locks, thumb actuated lever locks, or clamps. Other locking methods are anticipated.

In another aspect, the display panel 122 may be configured for relatively high resolution of the digital images displayed, including high definition (e.g., HD) display. The viewable surface of the display panel 122 may substantially conform to significant multiple-direction curvature of window glass occupying the window cavity 121 of the automotive vehicle 124.

In another aspect, the display panel 122 may be configured so that images appear to a viewer to have a three dimensional characteristic. The digital images may include at least one of text, graphics, and video received wirelessly 127 from at least one remote device 126, where the at least one remote device 126 is positioned in a specific location onboard or outside the vehicle 124.

In another aspect, the display panel 122 may be configured so that text, images and video images appear in a split screen configuration. Text and graphics may appear on one portion of the display panel 122, while video may appear on another portion of the display panel 122.

In another aspect, the electronic display apparatus may operate on its own power source (e.g., batteries, solar panels) or connect to the electrical system of the automotive vehicle 124, where connection is made using one of a removable connector 128 incorporated into a wiring harness or an extant electrical connector or port 129 in the automotive vehicle 124.

Referring now to FIG. 13, there is shown a non-limiting diagram of one embodiment of the present invention 110 wherein the viewable surface of the display panel 132 is substantially conformable to curvature of window glass occupying the window cavity 131 of the automotive vehicle 134. Digital images may be displayed so that they appear to a viewer to have a three dimensional characteristic.

In another aspect, the control device 133 may further comprise a transmitter for sending at least location information 137 to a remote device 136. Digital image files, textual content, and control instructions 1333 may be input to the storage device 1328 received from a remote device 1323 integrated into the automotive vehicle or external to the automotive vehicle 134. An electronic security code embedded into the display panel 132 uniquely identifies the display panel 132, and the security code is transmittable by the control device 133 or a communication device wired or wirelessly interfaced with the control device 133. The geographical location information for the display panel 132 and the security code identifier are transmittable to a remote device 136, and where the remote device 136 may respond with at least one of control instructions, textual content, and streaming video, and such content may be stored at least temporarily on a storage device 1328 connectable to the control device 136.

In yet other aspects, the display panel 1355 may be sized and shaped to conform to a side window cavity 1356 of the automotive vehicle 134. The display panel 1355 mounted in a side window may be operated and controlled independently or simultaneously in conjunction with the display panel 132 mounted in a rear window cavity 131, where instructions are provided by the control device 133 or remote device 1323.

Control instructions, text, graphics, and video may also be provided by a remote device 1334 present in or located near the vehicle 134, where the remote device 1334 may be a special purpose device configured specifically for use as part of the present invention, or a general purpose communication device such as an iPhone, or iPad (available from Apple, Inc.) or Samsung Galaxy Note 3 smartphone (available from Samsung Corporation). Use of other communication devices (e.g., iBeacon available from Apple, Inc.), including wearable devices (e.g., iWatch by Apple, Inc.) are anticipated as technology evolves.

Referring now to FIG. 14, there is shown a non-limiting diagram of the electronic display apparatus of the present invention 110 configurable to display digital images received wirelessly 137 from at least one remote device 136 and retain the digital images in a storage device 1328 connectable to the display panel 132 or the control device 133, the display panel 132 configured for relatively high resolution of the digital images displayed, and the viewable surface of the display panel 132 substantially conformable to curvature of window glass occupying the window cavity 131 of the automotive vehicle 134. The control device 133 of the electronic display apparatus is connectable to an extant connector or port 139 of the electrical system of the automotive vehicle 134 using a power cable 138.

In another aspect, the electronic display system 110 further comprises localized communication devices 146, 148, 149 configurable to send locally relevant textual content and digital images 147 receivable by the electronic display system for display on the display panel 132. Locally relevant textual content and digital images 147 may comprise text, graphics and video related to a specific location. Locally relevant aural content may also be sent for reproduction and play back on extant or added speakers on the automotive vehicle 134.

In other aspect, the display panel 132 may be mounted on the inside of the window glass of the automotive vehicle 134, or on the outside surface where the display panel 132 is weather resistant. The present invention 110 may be configured with the display 132 panel laminated to a surface or between layers of the window glass of the automotive vehicle 134. The display panel may be substantially transparent to allow an occupant of the automotive vehicle 134 outward visibilities while digital images or videos are displayed and when the display panel 132 is quiescent.

Referring now to FIG. 15, there is shown a non-limiting diagram of the electronic display system of the present invention 110 comprising a conformal digital display panel 132 installable on a surface structure of an automotive window glass, a control device 133 for wireless receiving of textual content, digital images and control instructions 137, a storage device 1328 for at least temporarily retaining digital image files and control instructions 137, a locator device 1560 for determining the location of the display system control device 133, a vehicle interface 1566 for interconnection with communication devices 1588 integrated into the automotive vehicle 134, and at least one remote device 136, 146, 148, 149 for sending text, graphics, video, and control commands to the display system control device 133. The control device 133 may communicate with at least one remote device 136 providing at least one of text, graphics, and video; particularly as the automotive vehicle 134 moves from one location to another. The locator device 1560 may comprise a receiver/processor for receiving position coordinates from the Global Positioning System (GPS) and indicating to the control device 133 the presence of the display device 132 within an adjustable range of a particular geographic location. In response, the control device 132 may activate display of a specific content set comprising at least one of text, graphics, audio, and video, which may be specific and related to a local area, enterprise, or event.

Referring now to FIG. 16, there is shown a non-limiting diagram of interconnection between various components of one embodiment of the present invention 110, including the display panel 132, the control device 133, the storage device 1328, the locator device 1560, a control device receiver-transmitter 1668, a vehicle integrated communication device 1588, the vehicle interface 1566, audio speakers 1589, and a remote device 146 positioned off the automotive vehicle (FIG. 15, 134). The control device 133 may communicate with at least one remote device 146 positioned in a specific location, particularly as the automotive vehicle (FIG. 15, 134) moves from one geographic location to another.

The remote device 146 may comprise a detector/communicator for detecting the presence of the display panel 132 or control device 133 or other locatable component within an adjustable detection range and communicating a command function to the control device 133 of the display system. The command function may include a trigger to activate a specific set of text, graphics, video, and audio content, which may be specific to a local area where the remote device is positioned. The control device 133 may be configured to interface with a receiver-transmitter 1668 for receiving text, video, graphics images, audio content, and control instructions from a remote device 146 (e.g., iBeacon from Apple, Inc.), or a special purpose device configured specifically for use as part of the present invention 110, or a general purpose communication device 1334 such as an iPhone or iPad (available from Apple, Inc.) or Samsung Galaxy 4 smartphone (available from Samsung Corporation). The display panel may be positioned adjacent to the window glass 1384.

Referring now to FIG. 17, there is shown a non-limiting diagram of a top level command sequencing for the control device (FIG. 16, 133) of the present invention 110, the command sequencing being the determinant of the presentation and display timing of text, video, and graphic images (e.g., advertising content), as well as aural content reproduction and audio play back on speakers (FIG. 16, 1589). Command sequence instructions and rules are loaded 170 into application code operable on the control device (FIG. 16, 133). Command sequence instructions and rules 170 may also govern display sequence 171 and receipt and storage 172 of text, video, graphic images, and aural content from remote devices (FIG. 15; 136, 146, 148, 149). Command sequence instructions and rules 170 may also govern conversion 1722 of textual content (e.g., SMS message text) to graphical format using text to graphics conversion tools such as those available at Textimg.net or Sourceforge.net, and others, hosted and operable on the control device (FIG. 16, 133) and integrated with the application code of the present invention 110. Command sequence instructions and rules 170 operable on the control device (FIG. 13, 133) may also govern display 174 of text, graphic images, and video in single or split screen 179 configuration, as well as repeat 175 of any specific display sequence or alteration 176 of a display sequence if the vehicle location changes. Command sequence instructions and rules 170 may also govern receiving location triggers 177 from local remote devices (FIG. 15, 146, 148, 149), and audio reproduction of aural content through speakers (FIG. 16, 1589) extant in or added to the automotive vehicle. Command sequence instructions and rules 170 may also govern communication and interaction with a remote device (FIG. 16, 1560) installed and operable on an automotive vehicle (FIG. 15, 134), or a remote device (FIG. 16, 1334) not positioned on the automotive vehicle (FIG. 15, 134).

Referring now to FIG. 18, there is shown a non-limiting diagram of a top level command sequencing for the control device (FIG. 16, 133) of the present invention 110, the command sequencing and location triggers 186 being the determinant of the presentation, content, and display timing of text, video, graphic images (e.g., advertising content), streaming video 1811, and aural content (audio) reproduction and play back through speakers (FIG. 16, 1589). Command sequence events are embedded in the application code operable on the control device (FIG. 16, 133).

Command sequence instructions and rules are loaded 180 into application code operable on the control device (FIG. 16, 133). Command sequence instructions and rules may also govern display sequence 181 and receipt and storage 182 of text, video, graphic images and aural content (audio) from remote devices (FIG. 15, 136, 146, 148, 149). Command sequence instructions and rules 180 may also govern conversion 1822 of textual content (e.g., SMS message text) to graphical format using text to graphics conversion tools such as those available at Textimg.net or Sourceforge.net, and others, hosted and operable on the control device (FIG. 16, 133) and integrated with the application code of the present invention 110. Command sequence instructions and rules 180 may also govern display 183 of text, graphic images, and video, reproduction of aural content through electronic speakers (FIG. 16, 1589), as well as repeat 184 of any specific display sequence or alteration 185 of a display sequence if the vehicle geographic location changes. Command sequence instructions and rules 180 may also govern receiving location triggers 186 from local remote devices (FIG. 15, 146, 148, 149). Command sequence instructions and rules 180 may also govern sending 187 geographic location coordinates to remote devices (FIG. 15, 146, 148, 149) positioned remotely from the automotive vehicle (FIG. 15, 134), as well as receiving 189 local instructions and rules, and associated text, graphic images and video 1810. Command sequence instructions and rules 180 may also govern display sequence alteration 1812 and streaming video display. Command sequence instructions and rules 180 may also govern communication and interaction with a remote device (FIG. 16, 1560) installed and operable on an automotive vehicle (FIG. 15, 134), such as a GPS receiver (FIG. 15, 1560).

Referring now to FIG. 19, there is shown a non-limiting diagram of the display panel 192 in one embodiment of the present invention 110 as it may typically be positioned in a window cavity 191 located on an automotive vehicle 194, where the automotive vehicle may be a bus as typically used in public transportation services or a rail car as may be used in surface and rail transportation systems. As shown, the physical dimensions of the display panel 192 generally fill and conform to the shape of the window cavity 191 and the viewable image area substantially fills the interior dimension of the window cavity 191 of the automotive vehicle 194. As shown, the display panel 192 is conformable to substantial curvature of the window cavity 191, if any, and mountable using a plurality of support structures as previously recited herein. The visible surface of the display panel 192 may be positioned to be viewable from inside or outside of the automotive vehicle 194. The present invention 110 may be configured with the display 192 panel laminated to a surface or between layers of the window glass (FIG. 16, 1384) of the automotive vehicle 194. The display panel 192 may be substantially transparent to allow an occupant of the automotive vehicle 194 outward visibilities while digital images or videos are displayed and when the display panel 192 is quiescent.

Referring now to FIG. 20, there is shown a non-limiting diagram of the electronic display apparatus of the present invention 110 configurable to receive a plurality of content types from at least one remote device 210 in response to a user initiated purchase of said content from the at least one remote device 210 using an electronic ordering and payment interface 230 (e.g., as displayed on mobile device 200) affiliated with said remote device 210. As shown, one embodiment of the present invention 110, may be configured including the display panel 132, the control device 133, the storage device 1328, the locator device 1560, a control device receiver-transmitter 1668, a vehicle integrated communication device 1588, the vehicle interface 1566, and audio speakers 1589. The present invention 110 may be configured with the display panel 132 mounted adjacent to the surface of the window glass (FIG. 16, 1384), laminated to or incorporated between layers of the window glass or substituted for the window glass of an automotive vehicle. The display panel 132 may be substantially transparent to allow an occupant of the automotive vehicle (e.g., FIG. 14, 134) outward visibilities while digital images or videos are displayed and when the display panel 132 is quiescent.

The control device 133 configured with the receiver-transmitter 1668 may communicate with at least one third-party remote device 210, to provide digital content 220 comprising at least graphic images and video. A mobile communication device 200 may be used to wirelessly connect 220 to a remote device 210 configured to provide digital content 230 comprising at least graphic images and video. The digital content 130 may be wirelessly received 220 by said mobile communication device 200 as part of completion of a payment transaction through said ordering and payment interface 260 operable on said remote device 210 and displayable on said mobile device 200. Said digital content 230 may be selectively transferred from said mobile communication device 200 to the control device 133 in the electronic display apparatus of the present invention 110. Said transfer of digital content 230 from the mobile communication device 200 to the control device 133 may be accomplished by wire using a standard USB port connection 250 or wirelessly using for example a standard Bluetooth connection 240. Said mobile communication device 200 may be a special purpose device configured specifically for use as part of the present invention 110 or a general purpose communication device such as an iPhone or iPad (available from Apple, Inc.) or Samsung Galaxy Note 3 smartphone (available from Samsung Corporation). Said remote device 210 may be operable as a web site on the Internet configured as a virtual store front providing an ordering and payment interface 260 (e.g., as shown on the mobile device 200) directed to purchase of at least text, graphics, and audio digital content.

Referring now to FIG. 21, there is shown a non-limiting diagram of a conformal digital display panel 201 of the present invention 110 installable on a flat or curved structure of a frame 202 mountable on the rear portion of an automotive vehicle 212. The mounting positions 204 for the frame 202 may be those intended for a license plate 205. According to aspects shown in FIG. 16, the electronic display system of the present invention may further comprise a control device 133 for wireless receiving of textual content, digital images, video, and control instructions, a storage device 1328 for at least temporarily retaining textual content, digital image files, video, and control instructions, a locator device 1560 for determining the location of the electronic display system 110, and a vehicle interface 1566 for interconnection with the automotive vehicle 212.

Referring now to FIG. 22, there is shown a non-limiting diagram of a conformal digital display panel 201 of the present invention 110 installable on a flat or curved structure of a frame 202 mountable on the rear portion of an automotive vehicle 212 as viewed from both the rear and side of the automotive vehicle 212. The frame 202 may be mountable by attaching an upper or center portion of the frame 202 to at least a rear windshield wiper assembly 211 using a rotational connector 207 encompassing the wiper assembly motor shaft 93, where the windshield wiper assembly comprises at least a motor (not visible), a motor shaft 93, and a wiper arm 211 attached to the motor shaft. The rotational connector 207 may include a shaft 91 as illustrated in FIG. 9. The frame 202 may be mountable by attaching a lower frame portion to connecting positions in a license plate cavity 203 on the rear portion of the automotive vehicle 212. The upper and lower frame mounting methods may be used together or separately, depending upon the size of the digital display 201.

In some embodiments, stabilizing connectors may be added at the side portions of the frame 202 depending on the size of the digital display panel 201. Where the width of the digital display requires stabilization, these connectors may be attachable to side portions of a rear door hatch (e.g., FIG. 11, 118) as commonly found on a sport utility vehicle (SUV).

In another aspect, the digital display panel 201 and other system components may be powered by connecting to the automotive vehicle electrical system using a power connector installable in the electrical port 206 commonly used for a lamp intended for illumination of a license plate 205, and said power connector may include a provision for an illuminator.

The present invention provides a new medium that can be ideally positioned on an automotive vehicle for increased brand promotion and mobile display advertising. This medium provides a new way to directly deliver mobile advertising as well as brand and personal messages to the public every day. Presentation of names, mottos, text, images, videos, audio, and logos related to promotion of all sports, popular music, corporate brands, products, entertainment events, movie characters, television programming, restaurants, retail establishments, financial institutions, service businesses, political candidates, as well as personal and public service messages (e.g., news, emergency announcements, Amber Alerts) are anticipated. Streaming video and audio may be presented that includes sporting and music events selectable by participants in tailgating or any outdoor entertainment event, from public sources (e.g., WiFi, Internet) or private local sources (e.g., personal video capture device). Text, graphics, and video can be presented in standard or high definition, three dimensionally, or split screen on the display panel. Text, graphics, and video can be presented for all brands and events associated with at least the National Football League (NFL), Major League Baseball, Collegiate sports (NCAA), the National Basketball Association (NBA), National Association for Stock Car Auto Racing (NASCAR), the National Hockey League (NHL), and American Motorcycle Association Pro Racing. Minor league and amateur sports teams, as well as extreme sports and individual athletes can be displayed. Simultaneously with the display of streaming video, real-time video captured by a local remote camera device may be viewed on the display panel. Associated audio content may be reproduced through the use of extant or added electronic speakers installed in the automotive vehicle.

The present invention provides a bandwidth-efficient method for producing displayable graphics by receiving SMS (Short Message Service) text messaging and dynamically converting that text messaging into image format for display. A text to image converter may be hosted on the control device (FIG. 16, 133). The text to image converter may employ capabilities such as those provided by converters available at Textimg.net or Sourceforge.net and presently used for converting keyboard entered text to graphical images for social media postings. In the present invention, various image styles and colors may be produced from text messages received in various text formats that can be sent using SMS. The SMS messages received use less bandwidth than sending the same text or other graphic in image format from a remote device. SMS stands for short message service. SMS is specified by the ETSI (standards GSM 03.40 and 03.38). SMS is also often referred to as texting, sending text messages or text messaging. The service allows for short text messages to be sent from one cell phone to another cell phone or from the Web to another cell phone or appropriately configured receiver. Connection to public networks may use any technology that allows an electronic device to exchange data or connect to the internet wirelessly using radio waves (e.g., WiFi), including any wireless local area network (WLAN) based on the Institute of Electrical and Electronics Engineers' (IEEE) 802.11 standards or similar or replacement standards.

The present invention provides a new medium for expressing personal messages and end user passion through pre-configured text and graphics, or alternatively custom designed text and graphics. For added impact, the display panel may be illuminated peripherally by an internal or external light source such as Light-Emitting-Diodes. The display system may be powered by batteries, solar cells, vehicle power, or a combination of these. Dynamic presentation of text, video, and graphics on automotive vehicles can be enabled and controlled by pre-programmed instruction sets operable in the control device of the present invention and stored in non-transient memory incorporated in the display panel or control device. Alternatively, said instruction sets may be received from a remote source by a wireless communication device electronically connected to the display panel, and written into said memory. The present invention may be attached at least to the rear window of any of the millions of sport utility vehicles (SUVs), pick-up trucks, and crossover vehicles in operation and manufactured every year. The present invention may also be mounted in window cavities present in millions of other types of automotive vehicles, including trucks (private and commercial), recreational vehicles, rail cars, public buses, taxis, personal transport vehicles, and golf cars.

The display panel (e.g., FIG. 20, 132) of the present invention may be configured using flexible display technologies such as those comprising organic light emitting diode (OLED) flexible-displays or active matrix organic light emitting diode (AMOLED) flexible displays available from companies such as NanoLumens, Inc., LG Electronics, Inc. and Samsung Electronics Co., Ltd. The display panel (e.g., FIG. 20, 132) of the present invention may be configured using transparent display panel technologies, including OLED and liquid crystal display (LCD), such as those available from LG Electronics, Inc., Samsung Electronics Co., Ltd. and a plurality of other manufacturers such as those listed on Alibaba.com. In some embodiments, the transparent displays may be structured as a substitute for automotive glass. Use of other types of display technologies are anticipated as they may become available in at least semi-flexible, variable shape configurations. The control device may be configured using a general purpose "smart device" selected from the variety of tablet style computers available from a multitude of manufacturers such as the Sony® Xperia Tablet Z (4G LTE), Samsung Galaxy® Tab 2 (4G LTE), or Apple iPad (4G LTE) or a "smart phone" such as Apple iPhone 5Samsung Galaxy® Note 3 or Motorola Droid MAXX. The present invention may also be configured using new versions of general purpose devices replacing the forgoing devices or new types of devices such as the iBeacon and iWatch developed by Apple, Inc., or a specific purpose device comprising at least a receiver, a command function processor, a display driver, a power interface, and a storage for retaining instruction sets. In other embodiments, the present invention may be configured to use a locator function such as those based on a GPS receiver as typically found in "smart devices." The instruction sets used in the present invention may be processed using application program code (e.g., smart phone apps) operable on the control device as may be configured for the present invention. The primary purpose of the application program code and instruction sets is directed to activating display and sequencing of text, video, graphic images, and aural content reproduction as audio output to speakers. Operating systems such as Android available from Google, Inc., Windows 8 available from Microsoft Corporation, or iOS7 available from Apple, Inc. may be used to configure the control device.

Communication between the control device (e.g., FIG. 16, 133 & FIG. 20, 200) of the present invention and remote devices may be accomplished using the 4G LTE standard for wireless communication of high-speed data for mobile phones and data terminals, as well as substitute standards. 4G LTE is based on the GSM/EDGEet UMTS/HSPA network technologies, increasing capacity and speed using a different radio interface together with core network improvements. The standard is developed by the 3GPP (3rd Generation Partnership Project) and is specified in its Release 8 document series, with minor enhancements described in Release 9. Subsequent releases are anticipated and may be employed. Communication between the control device and remote devices may also be accomplished using a variety of devices that conform to the 802.11a, 802.11b, 802.11g, or 802.11n wireless standards collectively known as Wi-Fi technologies. Additionally, Bluetooth and various other non Wi-Fi technologies also exist and may be employed, each also designed for specific networking applications.

Bluetooth is a wireless technology standard for exchanging data over short distances (using short-wavelength microwave transmissions in the ISM band from 2400-2480 MHz) from fixed and mobile devices, creating personal area networks (PANs) with high levels of security. Bluetooth is managed by the Bluetooth Special Interest Group, which has more than 19,000 member companies in the areas of telecommunication, computing, networking, and consumer electronics. Bluetooth was standardized as IEEE 802.15.1,but the standard is no longer maintained. The SIG oversees the development of the specification, manages the qualification program, and protects the trademarks.

Universal Serial Bus (USB) is an industry standard developed in the mid-1990s that defines the cables, connectors and communications protocols used in a bus for connection, communication, and power supply between computers and electronic devices. USB was designed to standardize the connection of computer peripherals (including keyboards, pointing devices digital cameras, printers, portable media players, disk drives and network adapters) to personal computers, both to communicate and to supply electric power. It has become commonplace on other devices, such as smartphones, PDAs and video game consoles. USB has effectively replaced a variety of earlier interfaces, such as serial and parallel ports, as well as separate power chargers for portable devices.

While specific embodiments of the present invention have been described and illustrated, it will be apparent to those skilled in the art that numerous modifications and variations can be made without departing from the scope of the invention as defined in the appended claims. It is understood that the words that have been used are words of description and illustration, rather than words of limitation. Although the invention has been described with reference to particular means, materials and embodiments, the invention is not intended to be limited to the particulars disclosed; rather, the invention extends to all functionally equivalent structures, methods and uses, such as are within the scope of the appended claims.

We claim:

1. An electronic display system configured to mount on an automotive vehicle equipped with a windshield mounted in a rear window cavity and a proximate windshield wiper assembly including at least a wiper motor and motor shaft, comprising:
    a display panel;
    a mounting structure said mounting structure including a frame adapted to receive said display panel and position said display panel in said rear window cavity;
    a plurality of mounting structure connectors including a rotational connector adapted to attach a portion of said mounting structure to said wiper motor shaft, said rotational connector comprising at least a right-angled connector and a snap connector for engaging said wiper motor shaft,
    where said rotational connector enables mounting said display panel positioned within said rear window cavity avoiding obstruction by said wiper assembly,
    said display panel is configured to present digital content received wirelessly from at least one remote device, and a translator for altering the form of said digital content including transformation of received textual and aural digital content to at least one of stationary and in-motion graphical images.

2. The electronic display system of claim 1, said right-angled connector further comprising a shaft adapted to engage said mounting structure.

3. The electronic display system of claim 1, wherein said support structure further comprises a lockable frame extensible to adjust positioning of said display panel.

4. The electronic display system of claim 3, wherein said lockable frame includes stabilizing connectors at side portions of the frame.

5. An electronic display system configured to mount on an automotive vehicle equipped with a windshield mounted in a rear window cavity and a proximate windshield wiper assembly including at least a wiper motor and motor shaft, comprising:
   a display panel;
   a mounting structure said mounting structure including a flame adapted to receive said display panel and position said display panel in said rear window cavity;
   a rotational connector adapted to attach a portion of said mounting structure to said wiper motor shaft, said rotational connector comprising a right-angled connector and a snap connector for engaging said wiper motor shaft, said right-angled connector further comprising at least a shaft configured with a conical shaped tip,
   where said display panel is positioned within said rear window cavity, and
   where said rotational connector prevents display panel obstruction by said wiper assembly,
   said display panel is configured to present digital content received wirelessly from at least one remote device, and
   said digital content is purchased and acquired from said at least one remote source.

6. The electronic display system of claim 5, wherein said support structure further comprises a connector adapted to engage said conical tip, and a lockable frame extensible to adjust positioning of said display panel.

7. The electronic display system of claim 6, wherein said lockable frame includes stabilizing connectors at side portions of the frame.

8. The electronic display system of claim 7, wherein said lockable frame is adapted to adjust to the size and shape of said window cavity.

9. The electronic display system of claim 5, further comprising a translator for altering the form of said digital content including transformation of received textual and aural digital content to at least one of stationary and in-motion graphical images.

10. The electronic display system of claim 5, wherein said mounting structure is adapted to position said display panel at a surface of said windshield external to said vehicle.

11. An electronic display system configured to mount on an automotive vehicle equipped with a windshield mounted in a rear window cavity and a proximate windshield wiper assembly including at least a wiper motor and motor shaft, comprising:
   a display panel;
   a mounting structure said mounting structure including a frame adapted to substantially conform to curvature of window glass occupying said window cavity, said frame further adapted to receive and position said display panel in said rear window cavity;
   a plurality of mounting structure connectors including a rotational connector adapted to attach a portion of said mounting structure to said wiper motor shaft, said rotational connector comprising at least a right-angled connector and a snap connector for engaging said wiper motor shaft,
   where said mounting structure is adapted to position said display panel at a surface of said windshield external to said vehicle, and
   where said rotational connector is adapted to mount said display panel avoiding obstruction by said wiper assembly,
   said display panel is configured to present digital content received wirelessly from at least one remote device, and
   said digital content is purchased and acquired from said at least one remote source.

12. The electronic display system of claim 11, wherein said support structure further comprises a connector adapted to engage said conical tip, and a lockable frame extensible to adjust positioning of said display panel.

13. The electronic display system of claim 12, wherein said lockable frame includes stabilizing connectors at side portions of the frame.

14. The electronic display system of claim 13, wherein said lockable frame is adapted to adjust to the size and shape of said window cavity.

* * * * *